US012794723B2

(12) United States Patent
Yang et al.

(10) Patent No.: US 12,794,723 B2
(45) Date of Patent: Nov. 10, 2026

(54) CREATING COMMUNICATION GROUPS BASED ON CONTENT INFORMATION

(71) Applicant: Beijing Zitiao Network Technology Co., Ltd., Beijing (CN)

(72) Inventors: Zhentao Yang, Beijing (CN); Xinlei Guo, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/380,178

(22) Filed: Oct. 15, 2023

(65) Prior Publication Data

US 2024/0039748 A1 Feb. 1, 2024

Related U.S. Application Data

(63) Continuation of application No. PCT/CN2022/088231, filed on Apr. 21, 2022.

(30) Foreign Application Priority Data

Apr. 26, 2021 (CN) ........................ 202110454564.2

(51) Int. Cl.
*H04L 12/18* (2006.01)
*G06F 3/0482* (2013.01)
*G06F 3/0484* (2022.01)

(52) U.S. Cl.
CPC ........ *H04L 12/1822* (2013.01); *G06F 3/0482* (2013.01); *G06F 3/0484* (2013.01)

(58) Field of Classification Search
CPC .................................................. H04L 12/1822
See application file for complete search history.

(56) References Cited

U.S. PATENT DOCUMENTS 9,477,945 B2 * 10/2016 Wu .................... G06F 3/04817
9,768,974 B1 * 9/2017 Lewis .................. H04L 12/185

(Continued)

FOREIGN PATENT DOCUMENTS

CN 101150536 A 3/2008
CN 107342932 A 11/2017

(Continued)

OTHER PUBLICATIONS

International Patent Application No. PCT/CN2022/088231; Int'l Search Report; dated Jul. 20, 2022; 2 pages.

(Continued)

*Primary Examiner* — Irete F Ehichioya
*Assistant Examiner* — Samuel Shen
(74) *Attorney, Agent, or Firm* — BakerHostetler

(57) ABSTRACT

The present disclosure provides an information processing method and apparatus, a terminal, and a storage medium. An information processing method, comprising: determining first content information in response to a first operation event for content information displayed in the current interface; displaying a first user and/or a second user in response to a second operation event for a group creation identifier associated with the first content information, wherein the first user is determined on the basis of the first content information, the second user is determined on the basis of second content information, and the second content information has an association relationship with the first content information; and creating a first communication group in the current interface on the basis of the first user and/or the second user. Embodiments of the present disclosure facilitating chatting and interaction among users on the basis of the content information.

20 Claims, 13 Drawing Sheets

(56) References Cited

U.S. PATENT DOCUMENTS

| | | | | |
|---|---|---|---|---|
| 10,021,059 | B1 | 7/2018 | Rao | |
| 2015/0363092 | A1* | 12/2015 | Morton | G06F 3/04817 715/752 |
| 2016/0299636 | A1* | 10/2016 | Lindenberg | H04L 12/1818 |
| 2017/0155521 | A1* | 6/2017 | Zhang | H04L 51/046 |
| 2020/0327171 | A1* | 10/2020 | Spataro | G06F 16/93 |
| 2020/0412679 | A1* | 12/2020 | Han | H04L 51/52 |
| 2021/0089179 | A1* | 3/2021 | Grantham | H04L 12/1822 |
| 2021/0173493 | A1* | 6/2021 | Barzilay | G06F 3/0482 |
| 2025/0173731 | A1* | 5/2025 | Gorny | G06Q 30/01 |

FOREIGN PATENT DOCUMENTS

| | | | |
|---|---|---|---|
| CN | 107360008 | A | 11/2017 |
| CN | 108494572 | A | 9/2018 |
| CN | 108512670 | A | 9/2018 |
| CN | 109768917 | A | 5/2019 |
| CN | 110061909 | A | 7/2019 |
| CN | 113098756 | A | 11/2019 |
| CN | 110890970 | A | 3/2020 |
| CN | 110971423 | A | 4/2020 |
| CN | 111049663 | A | 4/2020 |
| CN | 111182023 | A | 5/2020 |
| CN | 112073204 | A | 12/2020 |
| CN | 112702181 | A | 4/2021 |
| CN | 113438147 | A | 9/2021 |
| JP | 2007072523 | A | 3/2007 |
| JP | 2008500616 | A | 1/2008 |
| JP | 2013161168 | A | 8/2013 |
| JP | 2014071817 | A | 4/2014 |
| WO | WO 2014/086207 | A1 | 6/2014 |
| WO | WO 2017/003245 | A1 | 1/2017 |

OTHER PUBLICATIONS

Wise et al.; "Statistical Discourse Analysis of a Role-Based Online Discussion Forum: Patterns of Knowledge Construction"; 45th Hawaii Int'l Conf. on System Sciences; 2012; p. 3378-3386.

Dr. Jin Luojun; "System architecture of social network semantic TV"; China Digital TV; Jul. 2012; p. 58-64 (*contains English Translation*).

Zhou Peng; "The Design and Implementation of Distributed Chat Service Subsystem"; Nanjing University; Master's Thesis; Apr. 2015; 69 pages (*English Abstract on page VI*).

Huang S., et al., "State Machine Based Video Rate Adaptation Algorithm," Journal of Computer Applications, Jul. 10, 2018, vol. 38, No. 7, 06 Pages, ISSN 1001-9081, (with English Abstract).

International Search Report for International Application No. PCT/CN2021/117199, mailed Dec. 17, 2021, 5 pages.

Written Opinion for International Application No. PCT/CN2022/088231, mailed Jul. 20, 2022, 07 Pages.

Notice of Reasons for Refusal for Japanese Patent Application No. 2023-565602 dated Oct. 22, 2024, 8 pages.

* cited by examiner

CREATING COMMUNICATION GROUPS BASED ON CONTENT INFORMATION

CROSS REFERENCE

The disclosure is a continuation of PCT application Ser. No. PCT/CN2022/088231, titled "INFORMATION PROCESSING METHOD AND APPARATUS, TERMINAL, AND STORAGE MEDIUM", filed on Apr. 21, 2022, filed based on the Chinese Patent Application No. 202110454564.2, field on Apr. 26, 2021, titled "INFORMATION PROCESSING METHOD AND APPARATUS, TERMINAL, AND STORAGE MEDIUM" and claims priority to the Chinese Patent Application, the entire contents of both of which are incorporated herein by reference.

TECHNICAL FIELD

The present disclosure relates to the field of computer technology, and particularly relates to an information processing method and apparatus, a terminal and a storage medium.

BACKGROUND

It is often necessary to set some work targets in a work process. Generally, one work target is associated with a plurality of persons, and the plurality of persons are required to jointly complete the corresponding target. At present, it is impossible to develop efficient communication and cooperation for work target information.

SUMMARY

The present disclosure provides an information processing method and apparatus, terminal, and storage medium.

This disclosure adopts the following technical solution.

Embodiments of the present disclosure provide an information processing method including:

- determining first content information in response to a first operation event for content information displayed by a current interface;
- displaying a first user and/or a second user in response to a second operation event for a group creation identity associated with the first content information, wherein the first user is determined based on the first content information, the second user is determined based on second content information, and the second content information has an association relationship with the first content information; and
- creating a first communication group in the current interface based on the first user and/or the second user.

Embodiments of the present disclosure provide an information processing method including:

- determining first content information in response to a first operation event for content information displayed by a current interface;
- displaying group information in response to a second operation event for a group creation identity associated with the first content information, wherein the group information is determined based on a user who possesses the content information; and
- associating and displaying a corresponding communication group in the current interface in response to a selection operation on the group information.

Embodiments of the present disclosure provide an information processing apparatus, comprising:

- a determination unit, configured to determine first content information in response to a first operation event for content information displayed by a current interface; and
- a display unit, configured to display a first user and/or a second user in response to a second operation event for a group creation identity associated with the first content information, wherein the first user is determined based on the first content information, the second user is determined based on second content information, and the second content information has an association relationship with the first content information;
- a control unit, configured to create a first communication group in the current interface based on the first user and/or the second user.

Embodiments of the present disclosure provide an information processing apparatus, comprising:

- a determination module, configured to determine first content information in response to a first operation event for content information displayed by a current interface;
- a display module, configured to display group information in response to a second operation event for a group creation identity associated with the first content information, wherein the group information is determined based on a user who possesses the content information; and
- a control module, configured to associate and display a corresponding communication group in the current interface in response to a selection operation on the group information.

Embodiments of the present disclosure provide an electronic device, comprising: at least one memory and at least one processor;

- wherein the memory is configured to store program codes, and the processor is configured to invoke the program codes stored in the memory such that the electronic device performs the method of any one of above.

Embodiments of the present disclosure provide a storage medium for storing program codes, wherein the program codes are configured to perform the method of any one of above.

The present disclosure provides an information processing method including: determining first content information in response to a first operation event for content information displayed by a current interface; displaying a first user and/or a second user in response to a second operation event for a group creation identity associated with the first content information, wherein the first user is determined based on the first content information, the second user is determined based on second content information that has an association relationship with the first content information; and creating a first communication group in the current interface based on the first user and/or the second user. According to embodiments of the present disclosure, a communication group including a first user and/or a second user may be created for content information, so that it is convenient for users to communicate based on the content information.

BRIEF DESCRIPTION OF FIGURES

The foregoing and other features, advantages, and aspects of embodiments of the present disclosure will become more apparent in conjunction with the accompanying drawings and with reference to the following specific embodiments. Throughout the accompanying drawings, the same or similar accompanying symbols indicate the same or similar elements. It should be understood that the accompanying drawings are schematic and that elements and elements are not necessarily drawn to scale.

DETAILED DESCRIPTION

Embodiments of the present disclosure will be described in greater detail below with reference to the accompanying drawings. Although certain embodiments of the present disclosure are shown in the accompanying drawings, it should be understood, however, that the present disclosure may be realized in various forms and should not be construed as being limited to the embodiments set forth herein, but rather are provided for a more thorough and complete understanding of the present disclosure. It should be understood that the accompanying drawings and embodiments of the present disclosure are for exemplary purposes only and are not intended to limit the scope of protection of the present disclosure.

It should be understood that the individual steps documented in the method implementations of the present disclosure may be performed in accordance and/or in parallel. Furthermore, the method embodiments may include additional steps and/or omit performing the illustrated steps. The scope of the present disclosure is not limited in this regard.

As used herein, the term "including" and variations thereof are open-ended, i.e., "including but not limited to." The term "based on" is "based at least in part on." The term "one embodiment" means "at least one embodiment"; the term "another embodiment" means "at least one additional embodiment"; the term "another embodiment" means "at least one other embodiment"; and the term "some embodiments" means "at least some embodiments". Relevant definitions of other terms will be given in the description below.

It should be noted that the concepts of "first" and "second" mentioned in the present disclosure are only used to differentiate different devices, modules or units, and are not used to limit the order or interdependence of the functions performed by these devices, modules or units.

It should be noted that the modification of "a" mentioned in the present disclosure is schematic rather than restrictive, and the person skilled in the art should understand that it should be construed as "one or more" unless otherwise explicitly stated in the context.

The names of the messages or information interacted between the plurality of devices in the embodiments of the present disclosure are used for illustrative purposes only, and are not intended to place limitations on the scope of those messages or information.

The embodiments provided by the embodiments of the present application will be described in detail below in conjunction with the accompanying drawings.

Within companies or other organizations, work objectives are often set up, and the process of dealing with them often requires the involvement of one or more people, who are currently unable to communicate efficiently in relation to the work objectives.

Figure 1:
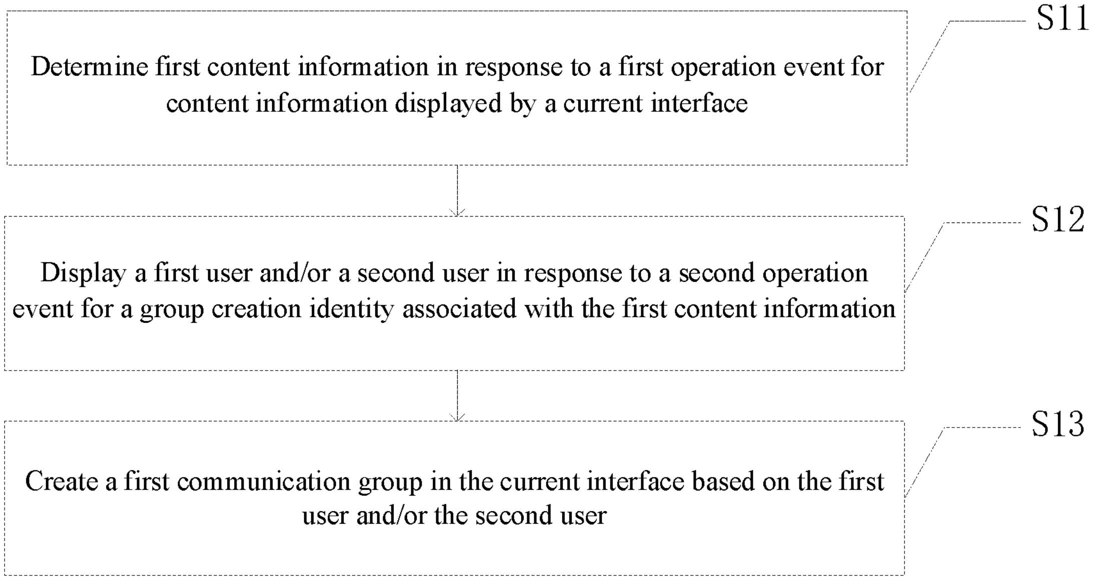
FIG. 1 is a flowchart illustrating an information processing method according to an embodiment of the present disclosure.

Some embodiments of the present disclosure provide an information processing method, as in FIG. 1, including:

S11: First content information is determined in response to a first operation event for content information displayed by a current interface.

Figure 2:
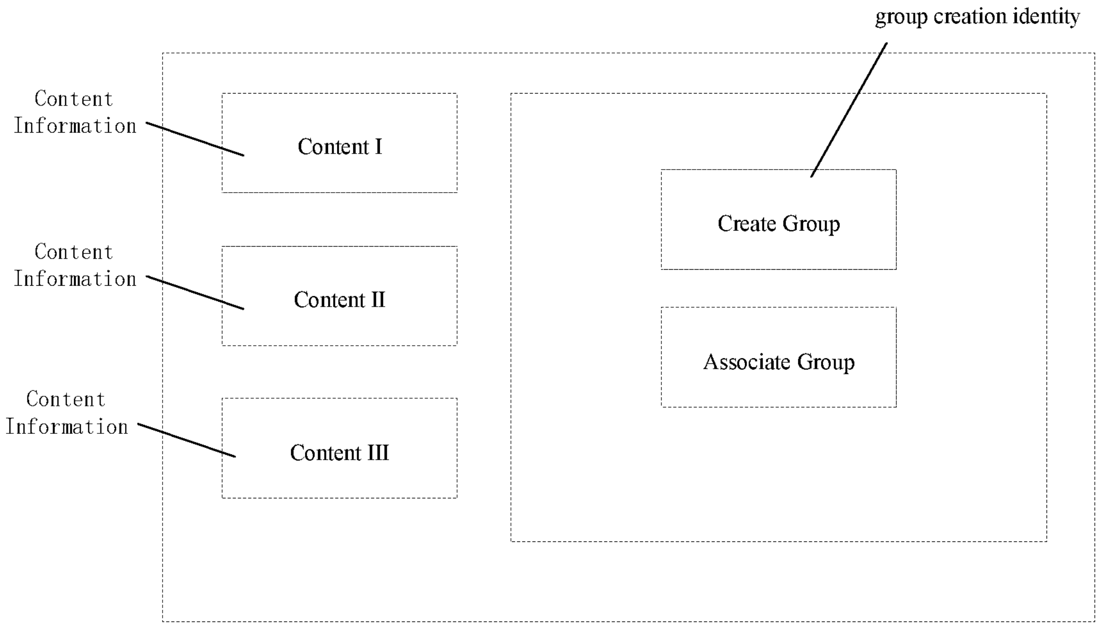
FIG. 2 is a schematic diagram illustrating a first region and a second region according to an embodiment of the present disclosure.

In some embodiments, according to a processing method provided in an embodiment of the present disclosure, content information is displayed in a current interface for a user. As shown in FIG. 2 that is a schematic diagram schematically showing a current interface, at least one content information is displayed by the current interface, and a first operation event may be, for example, a selection operation on any content information, wherein the selected content information is used as first content information. In some embodiments, a content detail interface is displayed after the first operation event is performed on any content information, and a group creation identity is displayed in the content detail interface. In other embodiments, the group creation identity may be displayed at a predetermined position all the time. In some embodiments, a time segment selection control is displayed in the current interface, and the current interface displays content information within a selected time segment based on the selected time segment. If there is no content information in the selected time segment, a content information creation identity may be displayed, wherein the content information creation identity is configured to create content information within the selected time segment after being triggered.

S12: A first user and/or a second user are/is displayed in response to a second operation event for a group creation identity associated with the first content information.

Figure 3:
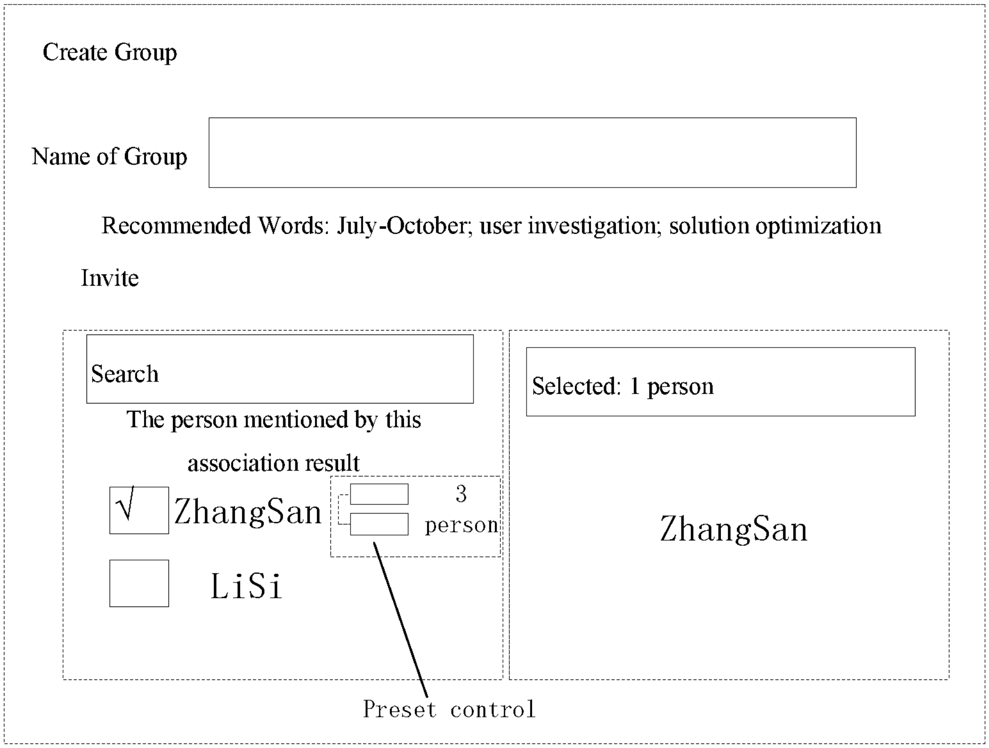
FIG. 3 is a schematic diagram illustrating a group creation interface according to an embodiment of the present disclosure.

In some embodiments, as shown in FIG. 3, a group creation interface is displayed after the second operation event is performed on the group creation identity shown in FIG. 2. The first user and/or the second user are/is displayed in the group creation interface, the first user is determined based on the first content information, the second user is determined based on second content information, and the second content information has an association relationship with the first content information, so that the first user related to the first content information and the second user related to the second content information associated with the first content information may be displayed simultaneously, which may not be limited to users related to the first content information. In some embodiments of the present disclosure, the first user may be, for example, a user who belongs with an owner of the first content information. For example, an owner of the first content information may be determined first, and then a first user belonging with the owner is determined, which indicates that the first user has an affiliation relationship with the owner of the first content information, wherein the affiliation relationship between the first user and the owner of the first content information may be, for example, an organization-collaboration relationship. Taking team collaboration as an example, if a team leader is the owner of the first content information, a team member in this team may be a first user who belongs with the owner of the first content information. In some embodiments of the present disclosure, the first user is a target user who mentions the owner of the first content information in first-type information or second-type information, wherein the first-type information or the second-type information in which the owner of the first content information is mentioned belongs to the target user. That is, if the target user mentions the owner of the first content information in its own first-type information or second-type information, the target user is the first user, and a mentioning manner may be "@user", which indicates that the target user pays more attention to the owner of the first content information, thereby determining that the target user is the first user.

S13: A first communication group is created in the current interface based on the first user and/or the second user.

In some embodiments, members in a first group may be determined based on the first user and/or the second user, and an association relationship may be established between the created first communication group and the first content information, so that the created first communication group is directly associated with the first content information, thereby making it easier for a user to create a communication group related to the first content information. In some embodiments, an association relationship is automatically established between members in the first communication group and the first content information after the first communication group is established, so that association operations of the user are reduced. In some embodiments, communication efficiency for the first content information is improved by creating a first content information-based communication group for the first user related to the first content information and the second user related to the second content information.

In some embodiments of the present disclosure, the content information displayed by the current interface belongs to a third user, and that the first communication group is created in the current interface based on the first user and/or the second user includes: creating a first communication group in the current interface based on the first user and/or the second user and the third user. In some embodiments, the third user is a user who possesses the content information displayed by the current interface, and the third user needs to be considered when the first communication group is created. For example, the third user may be a currently logged-in user, and the first user, the second user, and the third user may be different.

In some embodiments of the present disclosure, the content information includes first-type information and second-type information, wherein the second-type information has a correspondence relationship with the first-type information. The correspondence relationship may have various forms, for example, the second-type information may be child information of the first-type information, or the second-type information and the first-type information are in a superior-subordinate relationship or generic-specific relationship. The first content information may be first-type information, and the second content information may be second-type information. Similarly, the first content information may be second-type information, and the second content information may be first-type information. The first content information and the second content information may be associated based on the correspondence relationship of the first-type information and the second-type information. In some embodiments, the first content information and the second content information are different types of information.

In some embodiments of the present disclosure, in response to the first content information being the first-type information, the first user is determined based on the first content information includes: obtaining user identity information from the first content information, and determining the first user based on the user identity information. In some embodiments, the first content information may have user identity information when the first content information is first-type information. The first user may be, for example, a user mentioned in the first content information in a manner of"@" user, so that the first content information has a user identity, thereby obtaining and determining the first user.

In some embodiments of the present disclosure, in response to the first content information being second-type information, the first user is determined based on the first content information includes: obtaining user identity information from third content information and the first content information, and determining the first user based on the user identity information, wherein the third content information and the first content information have a correspondence relationship, and the third content information is first-type information. In some embodiments, in the case that the first content information is the second-type information, the third content information being the first-type information, which has a correspondence relationship with the first content information being the second-type information may be obtained. At this time, user identity information and corresponding first user are obtained from the first content information and the third content information, for example, users mentioned in the first content information and the third content information serve as the first users. At the moment, the creation of a first communication group may be based not only on the user mentioned in the first content information but also on the user mentioned in the corresponding third content information, so that the first communication group may be created based on the users related to the first content information directly and indirectly.

In some embodiments of the present disclosure, in response to the first content information being the second-type information, the first user is determined based on the first content information includes: obtaining user identity information from the first content information and content information having the same correspondence relationship with the first content information, and determining the first user based on the user identity information. In some embodiments, the first content information may have a correspondence relationship with the third content information being the first-type information when the first content information is the second-type information. The content information having the same correspondence relationship with the first content information may be, for example, content information, except for the first content information, which is the second-type information and has a correspondence relationship with the third content information. For example, the third content information is parent information, child information under the third content information includes the first content information, and other child information under the third content information is content information having the same correspondence relationship with the first content information. In some embodiments, the completion of one piece of content information requires the assistance from more than one other content information, so that discussion of one piece of content information may sometimes require consideration of other content information, and thus may require communication with an executive person or relevant person involved in other content information.

In some embodiments of the present disclosure, in response to the first content information being the first-type information, the first user is determined based on the first content information includes: obtaining user identity information from the first content information and fifth content information corresponding to the first content information, and determining the first user based on the user identity information. In some embodiments, the fifth content information is second-type information having a correspondence relationship with first-type information when the first content information is the first-type information. For example, when the correspondence relationship is a parent-child relationship, user identity information is obtained from parent information and child information when a first communication group is created for first-type information which is the parent information, and a first user corresponding to the user identity information is determined, for example, users mentioned in the parent information and the child information are obtained as first user.

In some embodiments of the present disclosure, the content information may be published topic content or topic content in an IM (Instant Messaging) message, wherein the topic content may be a message. The first content information and the second content information may be a first topic post (or topic message, initial message on which all reply messages are based) in the topic content, a reply post (or reply message) replying to the topic post, the remaining topic post published under the current topic content, or the like, which are not limited herein. For example, when the first content information is a first topic post, the second content information is a reply post replying to the topic post or the remaining topic post published under the current topic content; or, when the first content information is the remaining topic post published under the current topic content, the second content information is a reply post replying to the topic post; or, when the first content information is a reply post, the second content information is a reply post replying to the reply post. That is, the first content information has a corresponding association relationship with the second content information. Group members include a user who posts a topic post, a user who posts a reply post, and/or a user mentioned in the topic post or the reply post when a communication group is created.

In some embodiments of the present disclosure, the content information may be published task information, and the first content information and the second content information may be target information and sub-target information in the task information, which are not limited herein. For example, a first task has an association relationship with a second task in terms of task content. The first content information is target information of the first task, and the second content information is sub-target information under the target information; or, the first content information is target information of the first task, and the second content information is target information or sub-target information of the second task; or, the first content information is sub-target information of the first task, and the second content information is target information or sub-target information of the second task. That is, the target information and the sub-target information of the first task have an association relationship with the target information and the sub-target information of the second task. Group members include a user who posts the first task, a user who posts the second task, a user mentioned in target information or sub-target information of the first task, and/or a user mentioned in target information or sub-target information of the second task when a communication group is created.

In some embodiments of the present disclosure, in response to the first content information being first-type information, the second user is determined based on second content information includes: obtaining the second content information establishing an association relationship with the first content information; and determining a user who possesses the second content information as the second user. In some embodiments, the first content information is first-type information, and the second content information may be content information that does not originally have an association relationship between the first-type information and the second-type information with the first content information. An association relationship is established for the second content information and the first content information. For example, a parent-child relationship (relationship of parent information and child information) between the second content information and the first content information is established, and at this time, the second content information is the second-type information. Or a sibling relationship between the second content information and the first content information is established (being two pieces of child information under the same parent information), and at this time, the second content information is the first-type information. A user who possesses the second content information may be, for example, an associated user of the second content information. For example, the second user is a user responsible for processing the second content information.

In some embodiments of the present disclosure, in response to the first content information being second-type information, the second user is determined based on second content information includes: determining third content information having a correspondence relationship with the first content information, wherein the third content information is first-type information; obtaining second content information that establishes an association relationship with the third content information; and determining a user who possesses the second content information as the second user. In some embodiments, when the first content information is the second-type information, the third content information is the first-type information, and the first content information and the third content information have a correspondence relationship between the first-type information and the second-type information. The second content information and the third content information originally do not have a correspondence relationship between the first-type information and the second-type information. The second content information may be first-type information, or may also be second-type information, and an association relationship is established between the second content information and the third content information, for example, may be a parent-child relationship or a sibling relationship (e.g., becoming child information under the same parent information). A user who possesses the second content information is determined as the second user. The manner of establishing the association relationship may be based on contents of the third content information and the second content information. For example, a sibling relationship may be established if the contents of the third content information and the second content information are associated with the same content information, and a parent-child relationship may be established if the contents of the third content information and the second content information are directly associated.

In some embodiments of the present disclosure, the first user and/or the second user are/is displayed includes: displaying a preset control in an associated region where the second user is displayed, wherein the preset control is configured to represent that the second user is associated with a fourth user, fourth content information corresponding to the fourth user has an association relationship with the second content information, and the fourth content information does not have an association relationship with the first content information. In some embodiments, as shown in FIG. 3, a group creation interface may be displayed when the first communication group is created, and a recommended first user and/or second user are/is displayed in the group creation interface. Meanwhile, as shown in FIG. 3, the preset control is displayed, such as two rectangles connected by a connecting line and a number at the right of "ZhangSan" in FIG. 3. The present control indicates that the second user is associated with fourth user, and also displays the number that indicates the quantity of the fourth user, for example, the preset control in FIG. 3 indicates that "ZhangSan" is associated with 3 fourth users.

In some embodiments of the present disclosure, the method further includes: the fourth user is displayed in response to a triggering operation on the preset control. For example, as shown in FIG. 3, the preset control at the right of "ZhangSan" is triggered to display 3 fourth users associated with "ZhangSan", so that members in the first communication group may be selected not only from the first user and the second user, but also from the fourth users. This is because one piece of content information may be associated with other content information, for example, the first content information is completed only after other content information is completed, or, the first content information needs to be completed synchronously with other content information. Therefore, the recommended group members may include persons associated with the first content information, e.g., handlers of the first content information. If a person belongs with the first user associated with the first content information and the second user associated with the second content information, this person is only displayed once.

In some embodiments of the present disclosure, in response to the first content information being the first-type information, the first user and/or the second user are/is displayed includes: displaying the first user in front of the second user, wherein the first user is determined based on user identity information in the first content information, the second content information is content information that establishes an association relationship with the first content information, and the second user is a user who belong to the second content information. In some embodiments, the first user may be a user mentioned in the first content information, and the second content information is content information that establishes an association relationship with the first content information, so the first user is a user who is more closely related to the first content information, and is required to be displayed in front of the second user, for example, when the first user and the second user are displayed in the form of a list, the first user is displayed at the front of the list and the second user is displayed at the back of the list, such that the first user is displayed at a preferentially selected location.

In some embodiments of the present disclosure, a search box is also displayed in the group creation interface. The search box is configured to search for users, and may search for members that want to join the first communication group. In some embodiments, the group creation interface may also display a selected member interface in which selected members are shown, thereby making it convenient for a user to quickly determine the selected members in the case that there are a large number of recommended group members.

Figure 4:
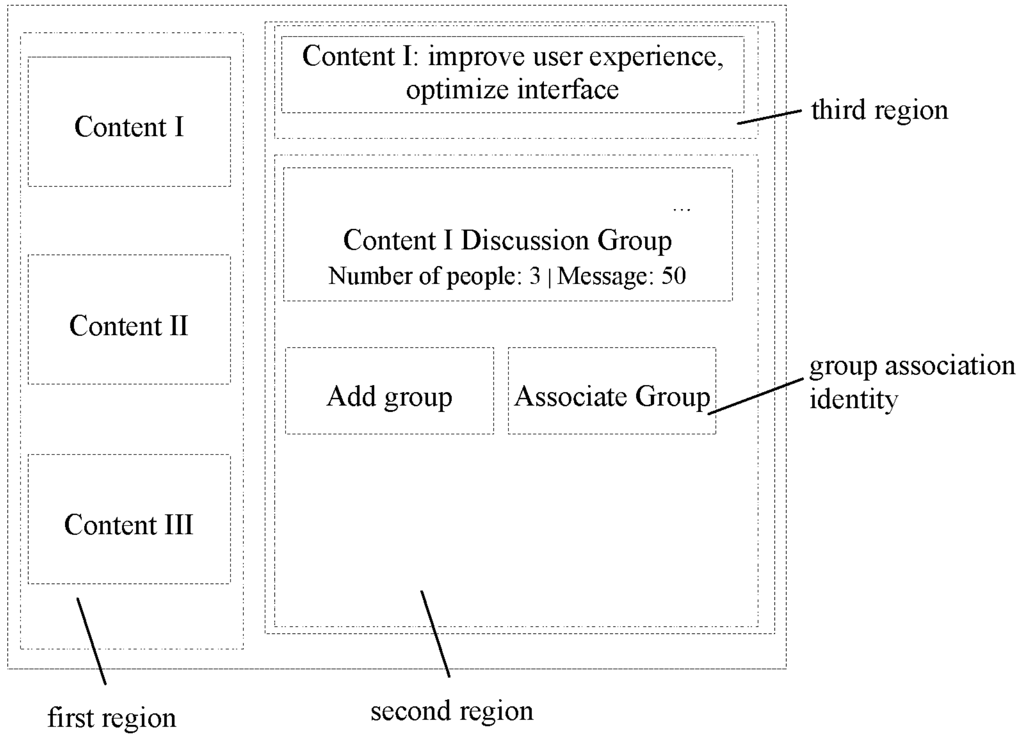
FIG. 4 is a schematic diagram illustrating a first region and a second region according to an embodiment of the present disclosure.

In some embodiments of the present disclosure, the content information is displayed in a first region of the current interface. The first communication group is created in the current interface based on the first user and/or the second user includes: generating a second region in the current interface, wherein the second region is configured to display the first communication group. In some embodiments, referring to FIG. 4, the first region is shown on the left side of FIG. 4, and the second region is shown on the lower right side of FIG. 4, wherein the created communication group is displayed in the second region. In this way, when content information on the left side of FIG. 4 is triggered, a communication group associated with the triggered content information may be displayed.

In some embodiments of the present disclosure, the content information is displayed in the first region of the current interface. The first communication group is created in the current interface based on the first user and/or the second user includes: generating a second region and a third region in the current interface, wherein the second region is configured to display the first communication group, and the third region is configured to display the first content information. In some embodiments, as shown in FIG. 4, the first region is shown on the left side of FIG. 4, the second region is shown on the lower right side of FIG. 4, and the third region is shown on the upper right side of FIG. 4. It is convenient for a user to see not only the specific content of the first content information and also the communication group associated with the first content information after the content information is selected in the first region by displaying the second region and the third region.

In some embodiments of the present disclosure, the method further includes: a communication group corresponding to the first communication group is created in an instant messaging tool for the third user who possesses the content information. In some embodiments, the third user who possesses the content information may be an associated person of the content information, such as a content information handler. A corresponding communication group is automatically created in the instant messaging tool for the third user after the first communication group is created, so that the third user may directly use the possessed instant messaging tool to conduct a session in the corresponding communication group. In some embodiments, the speech in the corresponding communication group in the instant messaging tool is automatically synchronized with the speech in the first communication group, i.e., the two communication groups are associated and have intercommunicating information.

In some embodiments of the present disclosure, the first communication group is created in the current interface includes: displaying at least one recommended word based on the first content information; and generating a name of the first communication group according to the selected recommended word in response to a selection operation on the at least one recommended word. In some embodiments, referring to FIG. 3, when the first communication group is created, recommended words are generated based on the information related to the first communication group and are displayed, and a user selects the recommended word so that the name of the first communication group may be formed. Since the recommended words are related to the first content information, it is possible to help the user to quickly generate an accurate name of the communication group, reduce the operation of the user. The user may also input information in a name input box of the communication group, and the name of the communication group may be a combination of the information input by the user and the selected recommended word. In some embodiments, the recommended word includes at least one of content sequence number information, content time information, and content detail information. The content sequence number information may be, for example, a number of the content information, and may be related to an arrangement order of the content information. The content time information may be, for example, processing time for the content information, for example, July-October in FIG. 3 indicates that the content information is processed during July-October. The content detail information may be, for example, a specific content required to be completed by the content information. In some embodiments, if a plurality of recommended words are selected, the selected plurality of recommended words are combined, and a name of a group is generated based on the combined result. In some embodiments, the name of the group is automatically filled after clicking on a recommended word. A plurality of recommended words may be separated by spaces, and the combination of the recommended words may be based on the selected order. The name of the group may be automatically generated based on the meaning of the selected recommended words.

In some embodiments of the present disclosure, a group identity is displayed in the first communication group, and the group identity includes an identity of the content information and a user identity associated with the content information. In some embodiments, the group identity includes not only the user identity, but also the identity of the content information, so that the content information associated with the user may be known directly from the group identity to facilitate a better understanding of the reason and meaning of a message in combination with the associated content information when the user makes a speech.

In some embodiments of the present disclosure, the group identity includes the identity of the content information and the user identity associated with the content information, includes: the group identity includes a sequence identity of the first-type information for the content information and/or a sequence identity of the second-type information for the content information. In some embodiments, a user group associated with the group identity may have associated content information. The content information may be distinguished by the sequence identity, and the content information associated with the user may be determined by the sequence identity of the first-type information for the content information. Similarly, the content information associated with the user may be determined by the sequence identity of the second-type information. In some embodiments, the user is simultaneously associated with the content information for the first-type information and the second-type information, and at this time, the sequence identity of the first-type information and the sequence identity of the second-type information may be displayed simultaneously.

In some embodiments of the present disclosure, the group identity includes the identity of the content information and the user identity associated with the content information, includes: the group identity includes an avatar of the user associated with the content information. In some embodiments, the identity of the content information may be displayed in the avatar of the user. In other embodiments, an avatar display control may be provided, and a region for displaying the avatar and a region for displaying the identity of the content information are provided in the display control. In some embodiments, identities associated with the same content information have the same display forms among different user identities, and identities of different content information have different display forms among different user identities, so that associated content information may be distinguished by the display forms.

In some embodiments, the group identity includes the identity of the content information and the user identity associated with the content information, includes: the group identity includes a first display region and a second display region. The identity of the content information is displayed in the first display region, and the user identity is displayed in the second display region. The first display region is different from the display region occupied by the second region in the group identity; or the first display region overlaps with the second display region; or the first display region floats on the second display region. In some embodiments, the display forms of the first display region and the second display region may be selected by a user associated with the user identity. Obscuration to the user identity may be prevented in the case that the first display region is different from the region occupied by the second display region. The association relationship between the user identity and the identity of the content information may be clearly determined in the case that the first display region overlaps with the second display region. In some embodiments, the relative position of the first display region and the second display region may be adjustable in the case that the first display region floats on the display second region, but the relative distance between the first display region and the second display region is not greater than a threshold.

In some embodiments, a member identity may be, for example, a group avatar of a member, and the group avatar may be, for example, a combination of a personal avatar and an information identity. The information identity may be a code, a serial number, a name, or the like of the content information. Different information identities may have different colors, and a user may select the color of the information identity may be selected, so that the user may know the content information associated with each group member, and thus knows the speech background and reason of the member.

In some embodiments, the first content information is selected by default after the first communication group is created. The first communication group displayed in the second region is also selected by default, and a session interface for the first communication group is displayed automatically. A fourth region may be created in the current interface, and the session interface for the first communication group is displayed in the fourth region such that the user learns that the session of the first communication group may be conducted in the current interface, and the session interface for the first communication group can be collapsed, for example, a collapsing control may be provided for collapsing the session interface. The first communication group is displayed at the instant messaging tool for the third user after successful creation of the first communication group.

In some embodiments of the present disclosure, the method further includes: the first content information is associated with at least one existing communication group based on the input information in response to the second operation event for a preset group association identity. In some embodiments, the group association identity may be displayed in the current interface, or may be displayed in the second region and the third region in response to an operation on the first content information. As shown in FIG. 4, the group association identity is displayed in the second region. The group association identity may be a key, and the second operation event may be a click operation on the group association identity.

Figure 5:
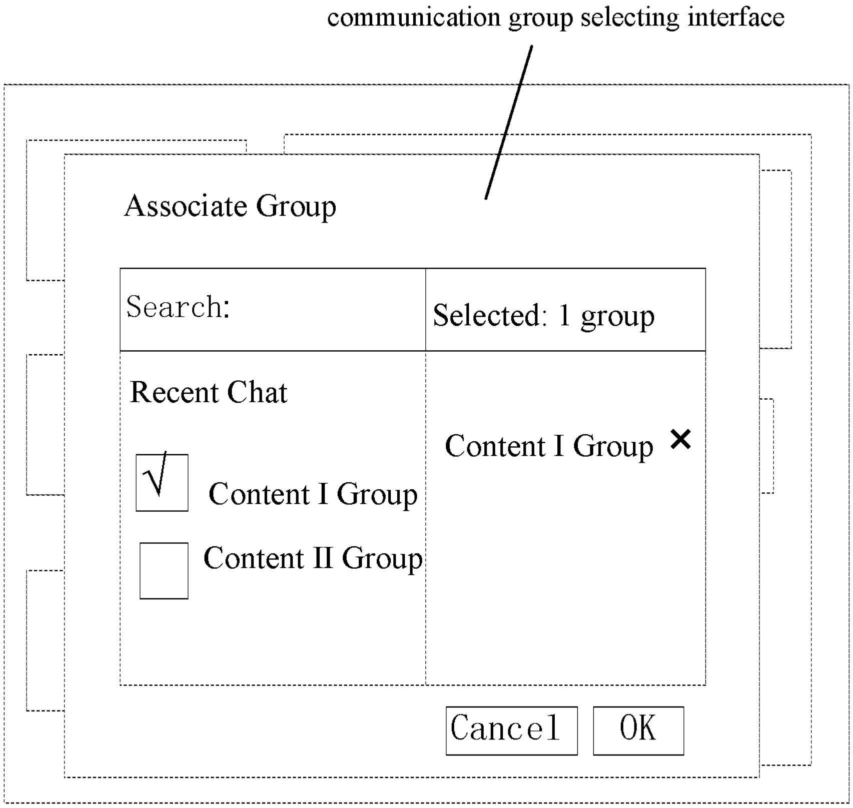
FIG. 5 is a schematic diagram illustrating display of an associated group according to an embodiment of the present disclosure.

In some embodiments of the present disclosure, the first content information is associated with at least one existing communication group based on the input information in response to the second operation event for the preset group association identity includes: displaying a communication group selecting interface in response to a second triggering event for the preset group association identity; associating the first content information with the selected communication group in response to a selection operation on a communication group in the communication group selecting interface, wherein the communication group selecting interface displays a communication group that has been associated with the first content information. In some embodiments, the communication group that has been associated with the first content information is selected by default. Therefore, the user is reminded which communication group has been associated with the first content information, avoiding repeated selection. In some embodiments, as shown in FIG. 5, the communication group selecting interface as shown in FIG. 5 may be displayed after the group association identity is triggered, wherein there may be alternative communication groups in the communication group selecting interface, or a search box may be displayed for searching communication groups. A selected group interface may be displayed after a group is selected in the group selecting interface, and the selected group is displayed in the selected group interface. After the communication group is selected, an OK button is clicked to associate the first content information with the selected communication group, or a Cancel button may be clicked to cancel. If no communication group is selected, the OK button is not displayed and cannot be clicked.

In some embodiments, the method further includes: the first content information fails to be associated with the selected communication group is determined and prompt information is displayed in response to the selected communication group being configured as that only a target person may add group members and the current user is not the target person, or in response to a network exception occurs. In some embodiments, a prompt is displayed if the selected communication group is set as that only the target person may add the group members, and the current user is not the target person, or if the selected communication group fails to be associated with the first content information due to network fluctuation. If the selected communication groups all fail in association, a first prompt message is displayed for reminding that all communication groups fail in association. If some of the selected communication groups fail in association, a second prompt message is displayed for reminding some of the communication groups fail in association.

In some embodiments of the present disclosure, the communication group created by the group creation identity is configured as that group entry verification is enabled by default. In some embodiments, when a user wants to join the communication group for which the group entry verification is enabled, the user needs to send verification information to the communication group to join the communication group after verification is passed. In some embodiments, the communication group created by the group creation identity is associated with the content information, and in view of the privacy of the content information, the group entry verification is enabled by default to prevent the content information from leakage.

In some embodiments of the present disclosure, the selected communication group associated with the content information is displayed in the second region. As shown on the right side in FIG. 4, the communication group associated with the content information is displayed in the second region, an association relationship between the communication group and the corresponding content information is canceled in response to an association canceling operation on any communication group displayed in the second region. For example, in FIG. 4, "content I discussion group" is a communication group associated with content I, a corresponding group of the communication group displays an association canceling control that is triggered to cancel the association relationship. The association canceling control may be displayed after an option control displayed as " . . . " in FIG. 4 is triggered. A pop-up box is displayed after the association canceling control is triggered, asking to determine whether to cancel the association relationship. A determination control and a cancel control may be displayed in the pop-up box. The association relationship is canceled after the confirmation control is triggered, and the association relationship is maintained after the cancel control is triggered. A prompt message may be displayed after the association relationship is canceled to indicate that the association relationship has been canceled.

Figure 6:
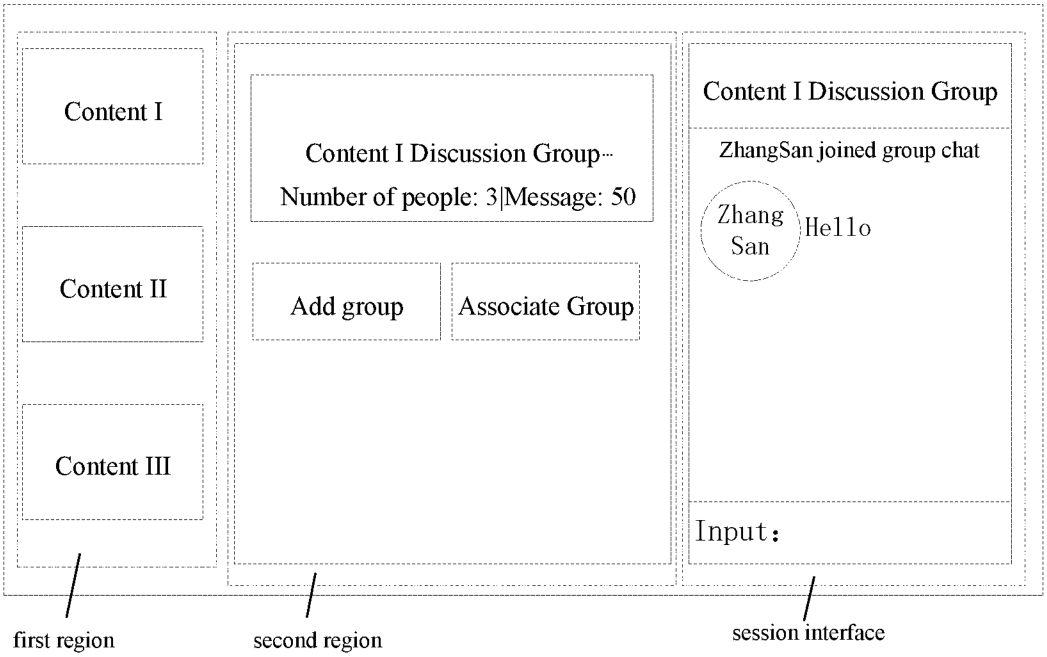
FIG. 6 is a schematic diagram illustrating a session interface of an associated group according to an embodiment of the present disclosure.

In some embodiments of the present disclosure, the method further includes: a communication group associated with sixth content information is displayed in response to a triggering operation on the sixth content information displayed by the current interface; a session interface for a second communication group is displayed in response to a triggering operation on a second communication group among communication groups associated with the displayed sixth content information, wherein the sixth content information may be the first content information, and the second communication group may be the first communication group. In some embodiments, referring to FIG. 6, the third content information is Content I. A first region is shown on the left side of FIG. 6, and a second region in the middle of FIG. 6 is displayed after content I in the first region is triggered. Communication groups associated with content I are displayed in the second region, and a session interface for the communication group is displayed after the communication group "content I discussion group" in the second region is triggered, so that a user can conduct a communication session directly at this session interface. In some embodiments of the present disclosure, a session interface for a communication group associated with the content information may be triggered by triggering the content information, thereby making it convenient for a user to quickly conduct a session related to the content information, helping the user to classify and manage the communication groups, reducing search operations of the user, and improving user experience.

Figure 7:
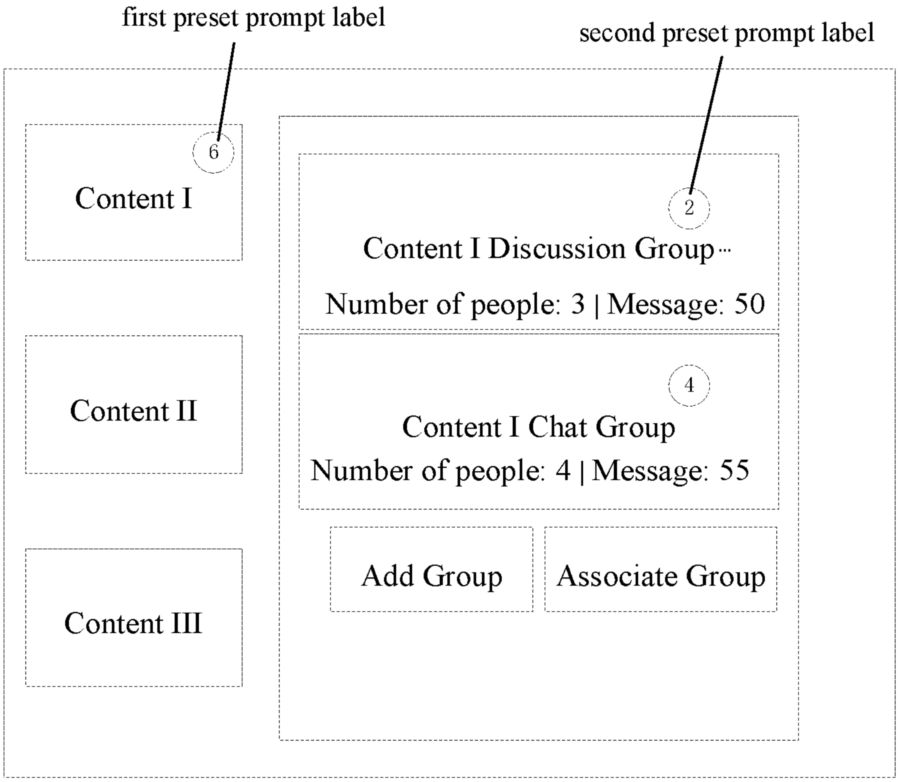
FIG. 7 is a schematic diagram illustrating a first region and a second region when an unread message is received according to an embodiment of the present disclosure.

In some embodiments of the present disclosure, the method further includes: in response to an unread message is generated in the third communication group associated with seventh content information among the content information, a first preset prompt label is displayed at a position corresponding to the seventh content information. In some embodiments, a second preset prompt label is displayed at a position corresponding to the third communication group associated with the seventh content information, wherein the seventh content information may be the first content information, and the third communication group may be the first communication group. The first prompt label may be a red dot. The seventh content information may be displayed in the first region of the current interface, and the third communication group associated with the seventh content information may be displayed in the second region of the current interface. In some embodiments, referring to FIG. 7, two associated communication groups are provided for Content I, and are "content I discussion group" and "content I chat group", respectively. The second preset prompt label (a circle with a number in FIG. 7) is displayed at a corresponding position (e.g., on a name or icon) of the content I discussion group after 2 unread messages are received in the content I discussion group. The second preset prompt label is also displayed at a corresponding position of the content I chat group after the content I chat group receives 4 unread messages. The second preset prompt label may display the number of unread messages. In some embodiments, with continued reference to FIG. 7, the first preset prompt label is displayed at the corresponding position of content I. The total number of unread messages of the associated communication group is displayed in the first preset prompt label, and is six in FIG. 7, so that a user may directly see whether there are unread messages and may open the session interface of the associated communication group, thereby quickly viewing the unread messages.

In some embodiments of the present disclosure, the method further includes: eighth content information displayed by the current interface is updated correspondingly after the content of the eighth content information is edited, and a name of the communication group associated with the content information is kept unchanged. In some embodiments, the eighth content information may be certain content information, e.g., first content information. The content of the eighth content information may be stored in a server, and may be deleted by accessing the server. The content information displayed by the current interface is automatically correspondingly modified after the content of the eighth content information is edited so as to maintain the correctness of the content information displayed by the current interface. Moreover, the name of the communication group associated with the eighth content information is not changed, so that a user is prevented from failing to recognize the group associated with the eighth content information in a group list, thereby avoiding causing inconvenience for the user.

In some embodiments of the present disclosure, ninth content information is deleted among the content information displayed by the current interface after the ninth content information is deleted. In some embodiments, the ninth content information is certain content information, e.g., the first content information. The ninth content information is automatically correspondingly deleted from the content information after the ninth content information is deleted, for example, the ninth content information is deleted at the server or at a terminal different from an executing side for the method. In some embodiments of the present disclosure, an arrangement order of tenth content information among the content information displayed by the current interface is correspondingly updated after the arrangement order of the tenth content information with respect to other content information is adjusted, and a member identity of in a communication group associated with the tenth content information is kept unchanged, wherein an information identity of the content information is related to the arrangement order of the content information, and an information identity of the content information associated with members is displayed in the member identity. In some embodiments, the information identity in the member identity is related to the arrangement order of the associated content information. after the arrangement order of the tenth content information with respect to other content information is changed, for example, the arrangement order of the tenth content information is adjusted on the server or the terminal different from the executing side for the method, the arrangement order of the tenth content information displayed among the content information is automatically adjusted, and the member identity in the communication group associated with the tenth content information is not affected. In an example that the member identity is an avatar with the information identity, an image of the avatar remains unchanged, and the information identity in the avatar remains in a state before the arrangement order of the tenth content information is adjusted.

In some embodiments of the present disclosure, the method further includes the following step: an association relationship between a fourth communication group and associated content information is canceled in response to a canceling operation on the fourth communication group. In some embodiments, the fourth communication group may be a communication group associated with one piece of content information, for example, may be the first communication group or the second communication group. The association relationship between the fourth communication group and the associated content information is automatically canceled after the fourth communication group is disbanded. The fourth communication group that has been disbanded may not be displayed after the associated content information is triggered, or a prompt message that the fourth communication group has been disbanded may be displayed.

Figure 8:
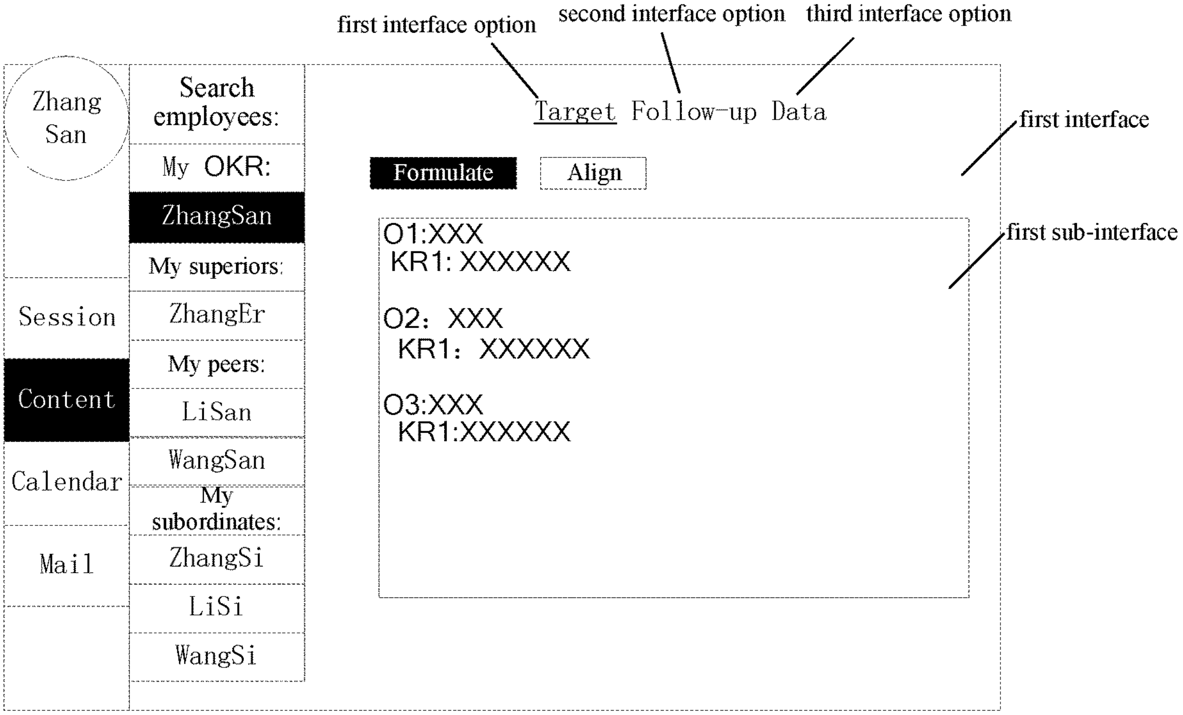
FIG. 8 is a schematic diagram illustrating a display interface of a client according to an embodiment of the present disclosure.
Figure 9:
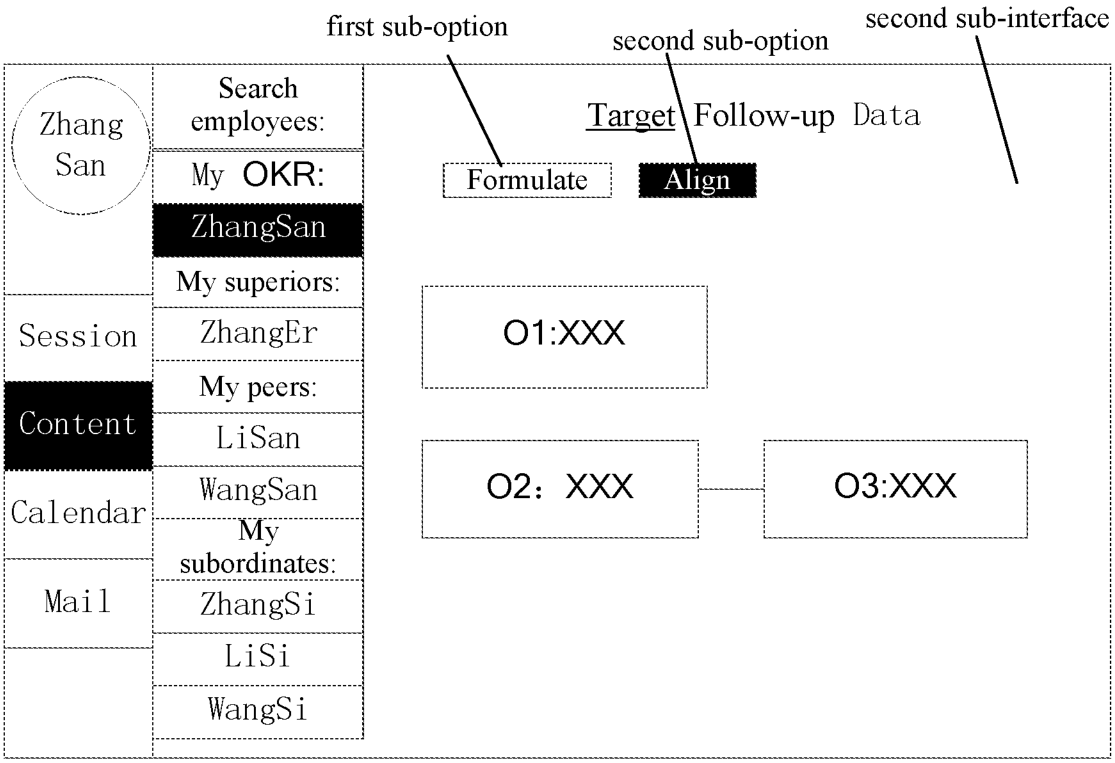
FIG. 9 is a schematic diagram illustrating a display interface of a client according to an embodiment of the present disclosure.
Figure 10:
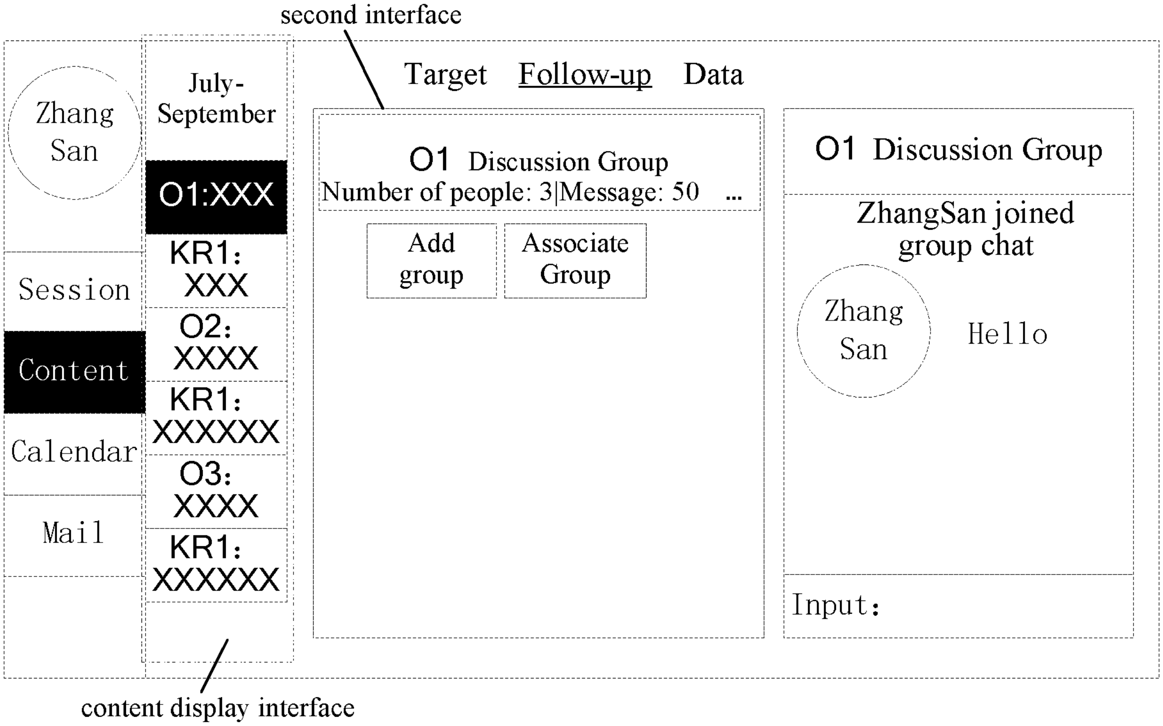
FIG. 10 is a schematic diagram illustrating a display interface of a client according to an embodiment of the present disclosure.
Figure 11:
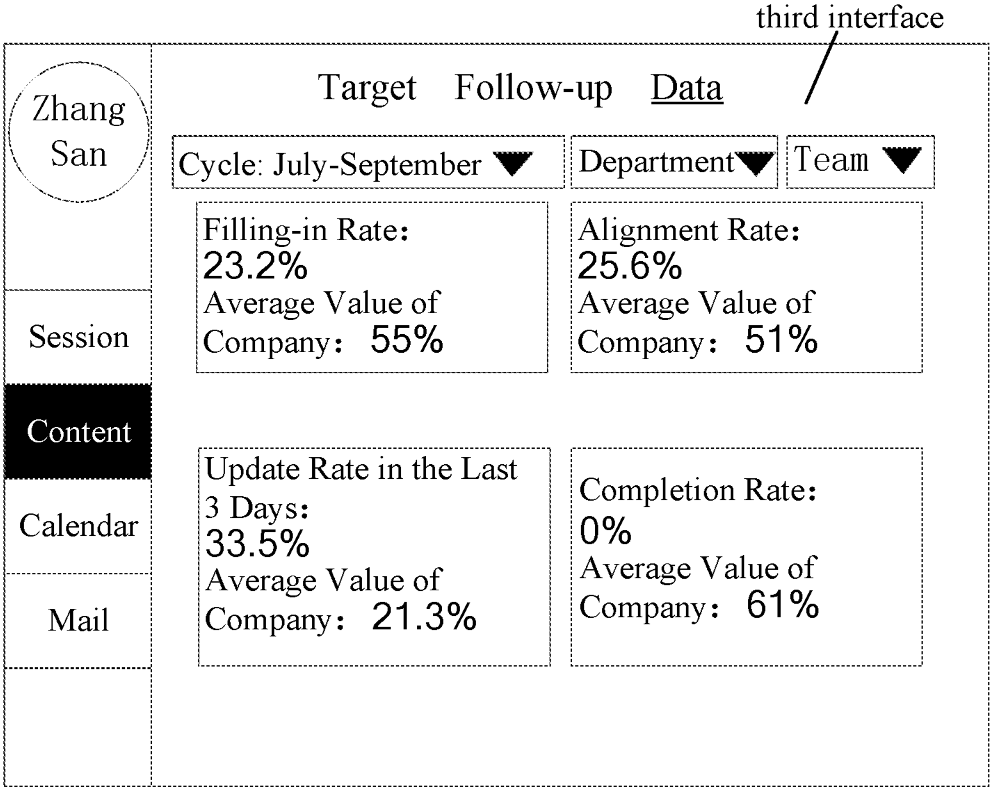
FIG. 11 is a schematic diagram illustrating a display interface of a client according to an embodiment of the present disclosure.

In order to better illustrate the method provided in the embodiment of the present disclosure, an example that the method provided in the embodiment of the present disclosure is configured for a client is for description. In some embodiments of the present disclosure, the client may be an instant messaging client. As shown in FIG. 8, a "content" option is displayed in the client, a personnel option is displayed after the "content" option is triggered. Relevant information of content information associated with a triggered person is displayed after the person in the personnel option is triggered. Taking the content information being OKR (object and key result) information as an example in FIG. 8, OKR information of the user is displayed after the user triggers the user's own name under "My OKR" in the personnel option. A plurality of interface options are displayed in a display interface of the client, and the interface options in FIG. 8 include a first interface option "target", a second interface option "follow-up" and a third interface option "data". A first interface is displayed after the first interface option (target) is triggered, and the first interface has a first sub-option (formulate) and a second sub-option (align) therein. A first sub-interface is displayed after the first sub-option is triggered, and an interface corresponding to the first interface option is opened by default after the client starts up or after a logged-in user is changed. The first sub-interface displays the current content information of the user. A second sub-interface is displayed (as shown in FIG. 9) after the second sub-option is triggered, and the second sub-interface displays a view after the association relationship is established for the content information. As shown in FIG. 10, the content information is displayed after the second interface option (follow-up) is triggered. The interface is provided with a content display interface (on the left side in FIG. 10) in the interface for displaying the content information. The content display interface displays a time segment selection control through which a time segment is selected. The content display interface displays content information within the selected time segment, content information within the current time is selected by default when the second interface is opened. If there is no content information in the current time segment, content information within the previous time segment is selected by default. If there is no content information within the previous period either, no content information is displayed by default, and the second region and the third region associated with the content information are blank by default. The first operation event may be performed on any content information in the first region, the content information subjected to the first operation event serves as the first content information, and the group creation identity and the group association identity are displayed in the second region for the first content information. The group creation identity is configured to create the communication group associated with the first content information after being triggered. The group association identity is configured to associate with the existing one or more communication groups after being triggered. If the first content information has been associated with a communication group, the communication group associated with the first content information is displayed after the first operation event is performed on the first content information, and in response to a triggering operation on the associated communication group, a session interface of the communication group may be displayed (on the right side of FIG. 10). The third interface is displayed after a third interface option(data) of the display interface is triggered, wherein data analysis on the content information is displayed in the third interface, and the data analysis may include, for example, a filling-in rate, a completion rate and a recent update rate of the content information to be viewed by the user conveniently. After the user leaves a page corresponding to the "content" option, but has not logged out of the login client nor been changed, the page corresponding to the "content" option that was displayed when the user left last time will be displayed by default when the user returns to the page corresponding to the "content" option again.

Figure 12:
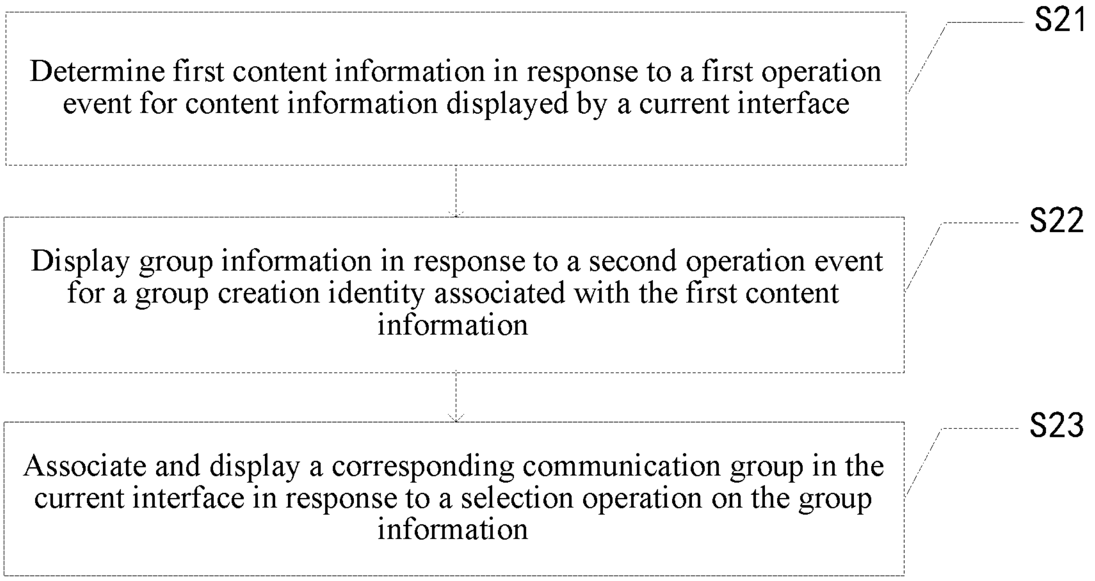
FIG. 12 is a flowchart illustrating an information processing method according to an embodiment of the present disclosure.

In some embodiments of the present disclosure, an information processing method is also provided. It needs to be noted that the technical features in any method embodiment of the present disclosure can be combined with this embodiment, and the description for any embodiment of the present disclosure may also be applied to this embodiment in the case that the techniques do not conflict. As shown in FIG. 12, the information processing method includes steps S21 to S23.

S21: First content information is determined in response to a first operation event for content information displayed by a current interface.

In some embodiments, the description of step S11 is also applied to this embodiment.

S22: Group information is displayed in response to a second operation event for a group creation identity associated with the first content information.

In some embodiments, the group creation identity may be displayed on the current interface all the time, or may be displayed in response to the first operation event. The group information is determined based on a user who possesses the content information, and may be an already existing communication group, wherein the user who possesses the content information may be, for example, a user responsible for processing the content information.

S23: A corresponding communication group is associated and displayed in the current interface in response to a selection operation on the group information.

In some embodiments, the selection operation on the group information may be, for example, a selection operation on one or more group information. The selected communication group may be associated and displayed in the current interface, and the communication group may be associated with the first content information. A session interface for the communication group may be displayed after the associated communication group is triggered. In some embodiments of the present disclosure, the communication group may be created for the first content information, so that it is convenient for users related to the first content information to communicate the first content information, thereby improving communication efficiency.

An embodiment of the present disclosure further provides an information processing apparatus, including:

- a determination unit, configured to determine first content information in response to a first operation event for content information displayed by a current interface; and
- a display unit, configured to display a first user and/or a second user in response to a second operation event for a group creation identity associated with the first content information, wherein the first user is determined based on the first content information, the second user is determined based on second content information, and the second content information has an association relationship with the first content information;
- a control unit, configured to create a first communication group in the current interface based on the first user and/or the second user.

In some embodiments, the content information displayed by the current interface belongs to a third user, and the control unit configured creates the first communication group in the current interface based on the first user and/or the second user, which includes: creating a first communication group in the current interface based on the first user and/or the second user and the third user.

In some embodiments, the content information includes first-type information and second-type information, wherein the second-type information has a correspondence relationship with the first-type information.

In some embodiments of the present disclosure, the determination unit determines the first user based on the first content information in response to the first content information being the first-type information, which includes: obtaining user identity information from the first content information, and determining the first user based on the user identity information.

In some embodiments, determining the first user based on the first content information in response to the first content information being second-type information includes: obtaining user identity information from third content information and the first content information, and determining the first user based on the user identity information, wherein the third content information and the first content information have a correspondence relationship, and the third content information is the first-type information.

In some embodiments, determining the first user based on the first content information in response to the first content information being the second-type information includes: obtaining user identity information from the first content information and content information having the same correspondence relationship with the first content information, and determining the first user based on the user identity information.

In some embodiments, determining the first user based on the first content information in response to the first content information being the second-type information includes: obtaining user identity information from the first content information and fifth content information corresponding to the first content information, and determining the first user based on the user identity information.

In some embodiments, determining the second user based on the second content information in response to the first content information being the first-type information includes: obtaining the second content information establishing an association relationship with the first content information; and determining a user who possesses the second content information as the second user.

In some embodiments, determining the second user based on the second content information in response to the first content information being the second-type information includes: determining third content information having a correspondence relationship with the first content information, wherein the third content information is the first-type information; obtaining second content information that establishes an association relationship with the third content information; and determining a user who possesses the second content information as the second user.

In some embodiments, the display unit displays the first user and/or the second user, which includes: displaying a preset control in an associated region where the second user is displayed, wherein the preset control is configured to represent that the second user is associated with a fourth user, fourth content information corresponding to the fourth user has an association relationship with the second content information, and the fourth content information does not have an association relationship with the first content information.

In some embodiments, the display unit is further configured to display a fourth user in response to a triggering operation on the preset control.

In some embodiments, displaying the first user and/or the second user in response to the first content information being the first-type information includes: displaying the first user in front of the second user, wherein the first user is determined based on user identity information in the first content information, the second content information is content information that establishes an association relationship with the first content information, and the second user is a user who belong to the second content information.

In some embodiments, the content information is displayed in a first region of the current interface. The control unit creates the first communication group in the current interface based on the first user and/or the second user, which includes: generating a second region in the current interface, wherein the second region is configured to display the first communication group.

In some embodiments, the content information is displayed in a first region of the current interface. The control unit creates the first communication group in the current interface based on the first user and/or the second user, which includes: generating a second region and a third region in the current interface, wherein the second region is configured to display the first communication group, and the third region is configured to display the first content information.

In some embodiments, the control unit is further configured to create a communication group corresponding to the first communication group in an instant messaging tool for the third user who possesses the content information.

In some embodiments, the control unit creates the first communication group in the current interface, which includes: displaying at least one recommended word based on the first content information; and generating a name of the first communication group according to the selected recommended word in response to a selection operation on the at least one recommended word.

In some embodiments, the recommended word includes at least one of content sequence number information, content time information, and content detail information.

In some embodiments, if a plurality of recommended words are selected, the selected plurality of recommended words are combined, and a name of a group is generated based on the combined result.

In some embodiments, a group identity is displayed in the first communication group, and the group identity includes an identity of the content information and a user identity associated with the content information.

In some embodiments, the group identity includes the identity of the content information and the user identity associated with the content information, includes: the group identity includes a sequence identity of the first-type information for the content information and/or a sequence identity of the second-type information for the content information.

In some embodiments, the group identity includes the identity of the content information and the user identity associated with the content information, includes: the group identity includes an avatar of the user associated with the content information.

In some embodiments, the group identity includes the identity of the content information and the user identity associated with the content information, includes: the group identity includes a first display region and a second display region. The identity of the content information is displayed in the first display region, and the user identity is displayed in the second display region. The first display region is different from the region occupied by the second display region in the group identity; or the first display region overlaps with the second display region; or the first display region floats on the second display region.

In some embodiments, the control unit is further configured to associate the first content information with at least one existing communication group based on the input information in response to the second operation event for a preset group association identity.

In some embodiments, associating the first content information with at least one existing communication group based on the input information in response to the second operation event for the preset group association identity includes: displaying a communication group selecting interface in response to a second triggering event for the preset group association identity; associating the first content information with the selected communication group in response to a selection operation on a communication group in the communication group selecting interface, wherein the communication group selecting interface displays a communication group that has been associated with the first content information.

In some embodiments, the control unit is further configured to determine that the first content information fails to be associated with the selected communication group and display prompt information in response to the selected communication group is configured as that only a target person may add group members and the current user is not the target person, or in response to a network exception occurs.

In some embodiments, the display unit is further configured to: display a communication group associated with sixth content information in response to a triggering operation on the sixth content information among the content information displayed at the current interface; and display a session interface for a second communication group in response to a triggering operation on the second communication group among communication groups associated with the sixth content information.

In some embodiments, the display unit is further configured to: display a first preset prompt label at a position corresponding to seventh content information, and/or display a second preset prompt label at a position corresponding to a third communication group associated with the seventh content information, in response to an unread message is generated in the third communication group associated with the seventh content information among the content information.

In some embodiments, the communication group created by the group creation identity is configured as that group entry verification is enabled by default.

In some embodiments, the display unit is further configured to: update eighth content information displayed by the current interface correspondingly after the content of the eighth content information is edited, and keep a name of the communication group associated with the content information unchanged; and/or, delete ninth content information among the content information displayed by the current interface after the ninth content information is deleted; and/or, update an arrangement order of tenth content information among the content information displayed by the current interface correspondingly after the arrangement order of the tenth content information with respect to other content information is adjusted, and keep a member identity of in a communication group associated with the tenth content information unchanged, wherein an information identity of the content information is related to the arrangement order of the content information, and an information identity of the content information associated with members is displayed in the member identity.

In some embodiments, the control unit is further configured to cancel an association relationship between a fourth communication group and associated content information in response to a canceling operation on the fourth communication group.

In some embodiments, the first user is a user who belongs with an owner of the first content information, or the first user is a target user who mentions the owner of the first content information in the first-type information or the second-type information, wherein the first-type information or the second-type information in which the owner of the first content information is mentioned belongs to the target user.

An embodiment of the present disclosure provides an information processing apparatus, including: a determination module configured to determine first content information in response to a first operation event for content information displayed by a current interface; a display module configured to display group information in response to a second operation event for a group creation identity associated with the first content information, wherein the group information is determined based on a user who possesses the content information; a control module configured to associate and display a corresponding communication group in the current interface in response to a selection operation on the group information.

Relevant parts refer to the partial description of the method embodiments since the apparatus embodiments substantially correspond to the method embodiments. The apparatus embodiments described above are merely illustrative, wherein modules described as separate modules may be or may not be separated. Some or all of the modules may be selected according to actual needs to achieve the objectives of the solutions in the embodiments. Those of ordinary skill in the art may understand and implement the embodiments without creative work.

In conclusion, the method and apparatus of the present disclosure are described based on the embodiments and application examples. In addition, the present disclosure also provides a terminal and a storage medium, which are described below.

Figure 13:
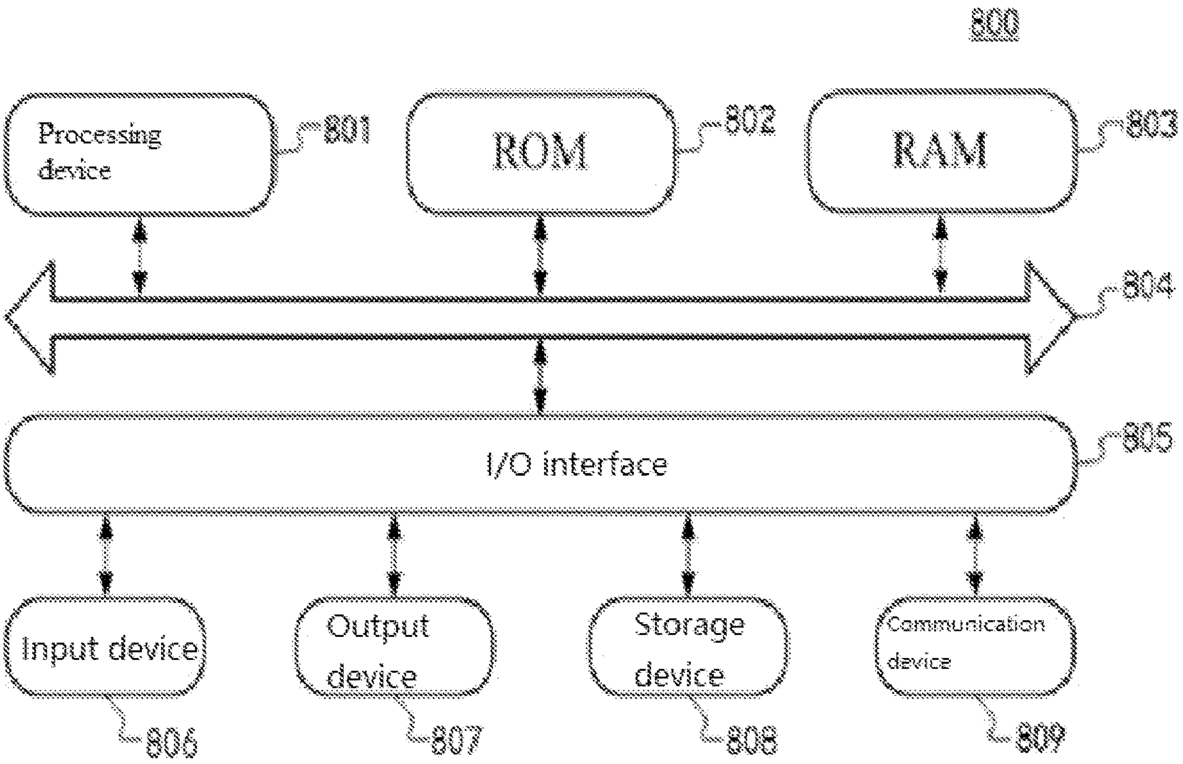
FIG. 13 is a structural schematic diagram of an electronic device according to an embodiment of the present disclosure.

Reference is made below to FIG. 13, which illustrates a schematic diagram of a structure of an electronic device (e.g., a terminal device or a server) 800 suitable for use in implementing embodiments of the present disclosure. Terminal devices in embodiments of the present disclosure may include, but are not limited to, mobile terminals such as mobile phones, laptop computers, digital broadcast receivers, PDAs (personal digital assistants), PADs (tablet computers), PMPs (portable multimedia players), in-vehicle terminals (e.g., in-vehicle navigation terminals), and the like, as well as fixed terminals such as digital TVs, desktop computers, and the like. The electronic device illustrated in the drawings is merely an example and should not impose any limitation on the functions and scope of use of the embodiments of the present disclosure.

The electronic device 800 may include a processing device (e.g., a central processor, a graphics processor, etc.) 801 that may perform various appropriate actions and processes based on a program stored in a read-only memory (ROM) 802 or loaded from the storage device 808 into a random access memory (RAM) 803. Also stored in the RAM 803 are various programs and data necessary for the operation of the electronic device 800. The processing device 801, the ROM 802, and the RAM 803 are connected to each other via a bus 804. An input/output (I/O) interface 805 is also connected to bus 804.

Typically, the following devices may be connected to the I/O interface 805: an input device 806 including, for example, a touch screen, a touch pad, a keyboard, a mouse, a camera, a microphone, an accelerometer, a gyroscope, and the like; an output device 807 including, for example, a liquid crystal display (LCD), a loudspeaker, a vibrator, and the like; a storage device 808 including, for example, a magnetic tape, a hard drive, and the like; and a communication device 809. The communication device 809 may allow the electronic device 800 to communicate wirelessly or wiredly with other devices to exchange data. Although electronic device 800 with various devices is illustrated in the figures, it should be understood that it is not required to implement or have all of the illustrated devices. More or fewer devices may alternatively be implemented or possessed.

In particular, according to embodiments of the present disclosure, the process described above with reference to the flowchart may be implemented as a computer software program. For example, embodiments of the present disclosure include a computer program product comprising a computer program carried on a computer readable medium, the computer program comprising program code for performing the method shown in the flowchart. In such embodiments, the computer program may be downloaded and installed from a network via a communication device 809, or from a storage device 808, or from a ROM 802. In the event that the computer program is executed by the processing device 801, the above-described functions defined in the method of an embodiment of the present disclosure are performed.

It is noted that the computer-readable medium described above in the present disclosure may be a computer-readable signal medium or a computer-readable storage medium or any combination of the above. The computer-readable storage medium may, for example, be—but is not limited to—a system, device, or apparatus, or device of electricity, magnetism, light, electromagnetism, infrared, or semiconductors, or any combination of the above. More specific examples of computer-readable storage media may include, but are not limited to: an electrical connection having one or more wires, a portable computer disk, a hard disk, a random access memory (RAM), a read-only memory (ROM), an erasable programmable read-only memory (EPROM or flash memory), a fiber optic, a compact disk read-only memory (CD-ROM) for portability, an optical storage device, magnetic memory device, or any suitable combination of the foregoing. In the context of the present disclosure, a computer-readable storage medium may be any tangible medium containing or storing a program that may be used by or in combination with an instruction execution system, apparatus, or device. And in the context of the present disclosure, a computer-readable signal medium may comprise a data signal propagated in a baseband or as part of a carrier carrying computer-readable program code. Such propagated data signals may take a variety of forms, including, but not limited to, electromagnetic signals, optical signals, or any suitable combination of the foregoing. The computer-readable signal medium may also be any computer-readable medium other than a computer-readable storage medium that sends, propagates, or transmits a program for use by, or in conjunction with, an instruction-executing system, apparatus, or device. The program code contained on the computer-readable medium may be transmitted using any suitable medium, including, but not limited to: wire, fiber optic cable, RF (radio frequency), etc., or any suitable combination of the foregoing.

In some implementations, the client, server may communicate utilizing any currently known or future developed network protocol such as HTTP (Hyper Text Transfer Protocol) and may be interconnected with digital data communications (e.g., communication networks) of any form or medium. Examples of communication networks include local area networks ("LANs"), wide area networks ("WANs"), inter-networks (e.g., the Internet), and end-to-end networks (e.g., ad hoc end-to-end networks), as well as any currently known or future developed networks.

The above-described computer-readable medium may be contained in the above-described electronic device; or it may be separate and not assembled into the electronic device.

The above-described computer-readable medium carries one or more programs that, when the above-described one or more programs are executed by the electronic device, cause the electronic device to perform the above-described method of the present disclosure.

Computer program code for performing the operations of the present disclosure may be written in one or more programming languages or combinations thereof, including object-oriented programming languages—such as Java, Smalltalk, C++—and conventional procedural programming languages—such as the "C" language or the like. "C" or similar programming languages. The program code may be executed entirely on the user's computer, partially on the user's computer, as a stand-alone software package, partially on the user's computer and partially on a remote computer, or entirely on a remote computer or server. In the case involving a remote computer, the remote computer may be connected to the user computer via any kind of network—including a local area network (LAN) or a wide area network (WAN)—or, alternatively, it may be connected to an external computer (e.g., by utilizing an Internet service provider to connect via the Internet).

The flowcharts and block diagrams in the accompanying drawings illustrate the architecture, functionality, and operation of systems, methods, and computer program products that may be implemented in accordance with various embodiments of the present disclosure. At this point, each box in the flowcharts or block diagrams may represent a module, program segment, or portion of code that contains one or more executable instructions for implementing a specified logical function. It should also be noted that in some implementations as replacements, the functions labeled in the boxes may also occur in a different order than those labeled in the accompanying drawings. For example, two consecutively represented boxes may actually be executed substantially in parallel, and they may sometimes be executed in reverse order, depending on the function involved. It should also be noted that each of the boxes in the block diagrams and/or flowcharts, and combinations of the boxes in the block diagrams and/or flowcharts, may be implemented with a specialized hardware-based system that performs the specified function or operation, or may be implemented with a combination of specialized hardware and computer instructions.

Units described as being involved in embodiments of the present disclosure may be implemented by way of software or may be implemented by way of hardware. Among other things, the name of a unit does not constitute a limitation of the unit itself in a given situation.

The functions described above herein may be performed, at least in part, by one or more hardware logic components. For example, non-limitingly, exemplary types of hardware logic components that may be used include: field programmable gate arrays (FPGAs), application-specific integrated circuits (ASICs), application-specific standard products (ASSPs), systems-on-chip (SOCs), complex programmable logic devices (CPLDs), and the like.

In the context of the present disclosure, a machine-readable medium may be a tangible medium that may contain or store a program for use by or in conjunction with an instruction execution system, device, or apparatus. The machine-readable medium may be a machine-readable signal medium or a machine-readable storage medium. The machine-readable medium may include, but is not limited to, an electronic, magnetic, optical, electromagnetic, infrared, or semiconductor system, device, or apparatus, or any suitable combination of the foregoing. More specific examples of machine-readable storage media would include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination of the foregoing. any suitable combination of the above.

According to one or more embodiments, the present disclosure provides an information processing method, comprising: determining first content information in response to a first operation event for content information displayed by a current interface;

displaying a first user and/or a second user in response to a second operation event for a group creation identity associated with the first content information, wherein the first user is determined based on the first content information, the second user is determined based on second content information, and the second content information has an association relationship with the first content information; and creating a first communication group in the current interface based on the first user and/or the second user.

According to one or more embodiments, the present disclosure provides an information processing method, wherein the content information displayed by the current interface belongs to a third user, and the creating the first communication group in the current interface based on the first user and/or the second user comprises:

creating a first communication group in the current interface based on the first user and/or the second user, and the third user.

According to one or more embodiments, the present disclosure provides an information processing method, wherein the content information comprises first-type information and second-type information, wherein the second-type information has a correspondence relationship with the first-type information.

According to one or more embodiments, the present disclosure provides an information processing method, in response to the first content information being the first-type information, the first user is determined based on the first content information comprises:

obtaining user identity information from the first content information, and determining the first user based on the user identity information.

According to one or more embodiments, the present disclosure provides an information processing method, in response to the first content information being the second-type information, the first user is determined based on the first content information comprises:

obtaining user identity information from third content information and the first content information, and determining the first user based on the user identity information, wherein the third content information and the first content information have a correspondence relationship, and the third content information is the first-type information.

According to one or more embodiments, the present disclosure provides an information processing method, in response to the first content information being the second-type information, the first user is determined based on the first content information comprises:

obtaining user identity information from the first content information and content information having the same correspondence relationship with the first content information, and determining the first user based on the user identity information.

According to one or more embodiments, the present disclosure provides an information processing method, in response to the first content information being the first-type information, the first user is determined based on the first content information comprises:

obtaining user identity information from the first content information and fifth content information corresponding to the first content information, and determining the first user based on the user identity information.

According to one or more embodiments, the present disclosure provides an information processing method, in response to the first content information being the first-type information, the second user is determined based on second content information comprises:

obtaining the second content information establishing an association relationship with the first content information; and determining a user who possesses the second content information as the second user.

According to one or more embodiments, the present disclosure provides an information processing method, in response to the first content information being the second-type information, the second user is determined based on second content information comprises:

determining third content information having a correspondence relationship with the first content information, wherein the third content information is the first-type information;

obtaining the second content information establishing an association relationship with the third content information; and determining a user who possesses the second content information as the second user.

According to one or more embodiments, the present disclosure provides an information processing method, the displaying the first user and/or the second user comprises:

displaying a preset control in an associated region where the second user is displayed, wherein the preset control is configured to represent that the second user is associated with a fourth user, fourth content information corresponding to the fourth user has an association relationship with the second content information, and the fourth content information does not have an association relationship with the first content information.

According to one or more embodiments, the present disclosure provides an information processing method, further comprising:

displaying the fourth user in response to a triggering operation to the preset control.

According to one or more embodiments, the present disclosure provides an information processing method, in response to the first content information being the first-type information, the displaying the first user and/or the second user comprises:

displaying the first user in front of the second user, wherein the first user is determined based on user identity information in the first content information, the second content information is content information that establishes an association relationship with the first content information, and the second user is a user who belong to the second content information.

According to one or more embodiments, the present disclosure provides an information processing method, wherein the content information is displayed at a first region of the current interface; and the creating the first communication group in the current interface based on the first user and/or the second user comprises:

generating a second region at the current interface, wherein the second region is configured to display the first communication group.

According to one or more embodiments, the present disclosure provides an information processing method, wherein the content information is displayed at a first region of the current interface; the creating the first communication group in the current interface based on the first user and/or the second user comprises:

generating a second region and a third region at the current interface, wherein the second region is configured to display the first communication group, and the third region is configured to display the first content information.

According to one or more embodiments, the present disclosure provides an information processing method, further comprising:

creating a communication group corresponding to the first communication group in an instant messaging tool for the third user who possesses the content information.

According to one or more embodiments, the present disclosure provides an information processing method, the creating the first communication group in the current interface comprises:

displaying at least one recommended word based on the first content information; and generating a name of the first communication group according to a selected recommended word in response to a selection operation on the at least one recommended word.

According to one or more embodiments, the present disclosure provides an information processing method, wherein the recommended word includes at least one of content sequence number information, content time information, and content detail information.

According to one or more embodiments, the present disclosure provides an information processing method, comprising:

combining, if a plurality of recommended words are selected, the selected recommended words, and generating the name of the group based on a combined result.

According to one or more embodiments, the present disclosure provides an information processing method, a group identity is displayed in the first communication group, and the group identity comprises an identity of the content information and a user identity associated with the content information.

According to one or more embodiments, the present disclosure provides an information processing method, wherein the group identity comprises the identity of the content information and the user identity associated with the content information, comprises:

the group identity comprises a sequence identity of the first-type information for the content information and/or a sequence identity of the second-type information for the content information.

According to one or more embodiments, the present disclosure provides an information processing method, wherein the group identity comprises the identity of the content information and the user identity associated with the content information, comprises:

the group identity comprises an avatar of a user associated with the content information.

According to one or more embodiments, the present disclosure provides an information processing method, wherein the group identity comprises the identity of the content information and the user identity associated with the content information, which comprises that the group identity comprises a first display region and a second display region; the identity of the content information is displayed in the first display region, and the user identity is displayed in the second display region; the first display region is different from the region occupied by the second display region in the group identity; or the first display region overlaps with the second display region; or the first display region floats on the second display region.

According to one or more embodiments, the present disclosure provides an information processing method, further comprising:

associating the first content information with at least one existing communication group based on the input information in response to the second operation event for a preset group association identity.

According to one or more embodiments, the present disclosure provides an information processing method, the associating the first content information with at least one existing communication group based on the input information in response to the second operation event for the preset group association identity comprises:

displaying a communication group selecting interface in response to a second triggering event for the preset group association identity;

associating the first content information with a selected communication group in response to a selection operation on a communication group in the communication group selecting interface;

wherein the communication group selecting interface displays the communication group associated with the first content information.

According to one or more embodiments, the present disclosure provides an information processing method, comprising:

in response to the selected communication group is configured as that only a target person may add group members and the current user is not the target person, or in response to a network exception occurs, determining that the first content information fails to be associated with the selected communication group and displaying prompt information.

According to one or more embodiments, the present disclosure provides an information processing method, further comprising:

displaying a communication group associated with sixth content information in response to a triggering operation on the sixth content information among the content information displayed at the current interface; and displaying a session interface for a second communication group in response to a triggering operation on the second communication group among communication groups associated with the sixth content information.

According to one or more embodiments, the present disclosure provides an information processing method, further comprising:

in response to an unread message is generated in the third communication group associated with seventh content information among the content information, displaying a first preset prompt label at a position corresponding to seventh content information, and/or displaying a second preset prompt label at a position corresponding to a third communication group associated with the seventh content information.

According to one or more embodiments, the present disclosure provides an information processing method, wherein a communication group created by the group creation identity is configured as that group entry verification is enabled by default.

According to one or more embodiments, the present disclosure provides an information processing method, further comprising:

updating eighth content information displayed by the current interface correspondingly after the content of the eighth content information is edited, and keeping a name of a communication group associated with the eighth content information unchanged; and/or, deleting ninth content information among the content information displayed by the current interface after the ninth content information is deleted; and/or, updating an arrangement order of tenth content information among the content information displayed by the current interface correspondingly after the arrangement order of the tenth content information with respect to other content information is adjusted, and keeping a member identity in a communication group associated with the tenth content information unchanged, wherein an information identity of the content information is related to the arrangement order of the content information, and an information identity of the content information associated with members is displayed in the member identity.

According to one or more embodiments, the present disclosure provides an information processing method, further comprising:

canceling an association relationship between a fourth communication group and associated content information in response to a canceling operation on the fourth communication group.

According to one or more embodiments, the present disclosure provides an information processing method, wherein the first user is a user who belongs with an owner of the first content information; or the first user is a target user who mentions the owner of the first content information in the first-type information or the second-type information, wherein the first-type information or the second-type information in which the owner of the first content information is mentioned belongs to the target user.

According to one or more embodiments, the present disclosure provides an information processing method, comprising:

determining first content information in response to a first operation event for content information displayed by a current interface;

displaying group information in response to a second operation event for a group creation identity associated with the first content information, wherein the group information is determined based on a user who possesses the content information; and associating and displaying a corresponding communication group in the current interface in response to a selection operation on the group information.

According to one or more embodiments, the present disclosure provides an information processing apparatus, comprising:

a determination unit, configured to determine first content information in response to a first operation event for content information displayed by a current interface; and a display unit, configured to display a first user and/or a second user in response to a second operation event for a group creation identity associated with the first content information, wherein the first user is determined based on the first content information, the second user is determined based on second content information, and the second content information has an association relationship with the first content information;

a control unit, configured to create a first communication group in the current interface based on the first user and/or the second user.

According to one or more embodiments, the present disclosure provides an information processing apparatus, comprising:

a determination module, configured to determine first content information in response to a first operation event for content information displayed by a current interface;

a display module, configured to display group information in response to a second operation event for a group creation identity associated with the first content information, wherein the group information is determined based on a user who possesses the content information; and a control module, configured to associate and display a corresponding communication group in the current interface in response to a selection operation on the group information.

According to one or more embodiments, the present disclosure provides an electronic device, comprising:

at least one memory and at least one processor;

wherein the memory is configured to store program codes, and the processor is configured to invoke the program codes stored in the memory such that the electronic device performs the method of any one of above.

According to one or more embodiments, the present disclosure provides a storage medium for storing program codes, wherein the program codes are configured to perform the method of any one of above.

The above description is only a preferred embodiment of the present disclosure and an illustration of the technical principles utilized. It should be understood by those skilled in the art that the scope of disclosure involved in the present disclosure is not limited to technical solutions formed by a particular combination of the above technical features, but also covers other technical solutions formed by any combination of the above technical features or their equivalent features without departing from the above disclosed concept. For example, a technical solution formed by interchanging the above-mentioned features with technical features having similar functions disclosed in the present disclosure (but not limited to).

Furthermore, although the operations are depicted using a particular order, this should not be construed as requiring that the operations be performed in the particular order shown or in a sequential order of execution. Multitasking and parallel processing may be advantageous in certain environments. Similarly, while several specific implementation details are included in the above discussion, these should not be construed as limiting the scope of the present disclosure. Certain features described in the context of separate embodiments may also be implemented in combination in a single embodiment. Conversely, various features described in the context of a single embodiment may also be implemented in multiple embodiments, either individually or in any suitable sub-combination.

Although the present subject matter has been described using language specific to structural features and/or method logic actions, it should be understood that the subject matter defined in the appended claims is not necessarily limited to the particular features or actions described above. Rather, the particular features and actions described above are merely exemplary forms of realizing the claims.

What is claimed is:

1. A method of creating communication groups based on selected collaborative task information, comprising:

displaying content information within a selected time segment in a first region of a current interface, wherein the content information comprises published task information about collaborative tasks, and wherein the first region is configured to display a time segment selection control through which the time segment is selected;

determining first content information in response to a first operation event for selecting certain information from the content information displayed in the first region of the current interface, wherein the first content information comprises information of a first task among the collaborative tasks;

displaying an interface element in a second region of the current interface in response to determining the information of the first task, wherein the interface element is configured to enable creations of communication groups associated with the information of the first task, and wherein the interface element is a single interface element;

displaying a group creation interface in response to a second operation event performed on the interface element;

determining a first user based on a collaborative relationship between the first user and an owner of the information of the first task, and displaying a representation corresponding to the first user in the group creation interface;

determining a second user based on second content information that comprises information of a second task among the collaborative tasks, and displaying a representation corresponding to the second user in the group creation interface, wherein the second task has an association relationship with the first task;

displaying a search box in the group creation interface, wherein the search box is configured to search for at least one additional user;

creating a first communication group associated with the information of the first task based on the first user, the second user, and the at least one additional user, the created first communication group being a new group; and displaying a session of the first communication group comprising the first user, the second user, and the at least one additional user in a third region of the current interface.

2. The information processing method according to claim 1, wherein the content information displayed by the current interface belongs to a third user, and the creating the first communication group in the current interface based on the first user and/or the second user comprises: creating a first communication group in the current interface based on the first user and/or the second user, and the third user; or the content information comprises first-type information and second-type information, wherein the second-type information has a correspondence relationship with the first-type information.

3. The information processing method according to claim 1, in response to the first content information being first-type information, the first user is determined based on the first content information comprises: obtaining user identity information from the first content information, and determining the first user based on the user identity information;

or, in response to the first content information being the second-type information, the first user is determined based on the first content information comprises: obtaining user identity information from third content information and the first content information, and determining the first user based on the user identity information, wherein the third content information and the first content information have a correspondence relationship, and the third content information is the first-type information;

or, in response to the first content information being the second-type information, the first user is determined based on the first content information comprises: obtaining user identity information from the first content information and content information having the same correspondence relationship with the first content information, and determining the first user based on the user identity information;

or, in response to the first content information being the first-type information, the first user is determined based on the first content information comprises: obtaining user identity information from the first content information and fifth content information corresponding to the first content information, and determining the first user based on the user identity information;

or, in response to the first content information being the first-type information, the second user is determined based on second content information comprises: obtaining the second content information establishing an association relationship with the first content information; and determining a user who possesses the second content information as the second user;

or, in response to the first content information being the second-type information, the second user is determined based on second content information comprises: determining third content information having a correspondence relationship with the first content information, wherein the third content information is the first-type information; obtaining the second content information establishing an association relationship with the third content information; and determining a user who possesses the second content information as the second user.

4. The information processing method according to claim 1, further comprising:

displaying a preset control in an associated region where the second user is displayed, wherein the preset control is configured to represent that the second user is associated with a fourth user, fourth content information corresponding to the fourth user has an association relationship with the second content information, and the fourth content information does not have an association relationship with the first content information.

5. The information processing method according to claim 4, further comprising:

displaying the fourth user in response to a triggering operation to the preset control.

6. The information processing method according to claim 1, in response to the first content information being first-type information, displaying the first user in front of the second user, wherein the first user is determined based on user identity information in the first content information, the second content information is content information that establishes an association relationship with the first content information, and the second user is a user who belong to the second content information.

7. The information processing method according to claim 1, further comprising:

creating a communication group corresponding to the first communication group in an instant messaging tool for a third user who possesses the content information.

8. The information processing method according to claim 1, the creating the first communication group comprises:

displaying at least one recommended word based on the first content information; and generating a name of the first communication group according to a selected recommended word in response to a selection operation on the at least one recommended word.

9. The information processing method according to claim 8, wherein the recommended word includes at least one of content sequence number information, content time information, and content detail information; or, combining, if a plurality of recommended words are selected, the selected recommended words, and generating the name of the group based on a combined result.

10. The information processing method according to claim 1, a group identity is displayed in the first communication group, and the group identity comprises an identity of the content information and a user identity associated with the content information.

11. The information processing method according to claim 10, wherein the group identity comprises the identity of the content information and the user identity associated with the content information, comprises:

the group identity comprises a sequence identity of the first-type information for the content information and/or a sequence identity of the second-type information for the content information;

or, the group identity comprises the identity of the content information and the user identity associated with the content information, comprises:

the group identity comprises an avatar of a user associated with the content information;

or, the group identity comprises the identity of the content information and the user identity associated with the content information, which comprises that the group identity comprises a first display region and a second display region; the identity of the content information is displayed in the first display region, and the user identity is displayed in the second display region; the first display region is different from the region occupied by the second display region in the group identity; or the first display region overlaps with the second display region; or the first display region floats on the second display region.

12. The information processing method according to claim 1, further comprising:

associating the first content information with at least one existing communication group based on the input information in response to the second operation event for a preset group association identity.

13. The information processing method according to claim 12, the associating the first content information with at least one existing communication group based on the input information in response to the second operation event for the preset group association identity comprises:

displaying a communication group selecting interface in response to a second triggering event for the preset group association identity;

associating the first content information with a selected communication group in response to a selection operation on a communication group in the communication group selecting interface;

wherein the communication group selecting interface displays the communication group associated with the first content information.

14. The information processing method according to claim 13, comprising:

in response to the selected communication group is configured as that only a target person may add group members and the current user is not the target person, or in response to a network exception occurs, determining that the first content information fails to be associated with the selected communication group and displaying prompt information.

15. The information processing method according to claim 1, further comprising:

displaying a communication group associated with sixth content information in response to a triggering operation on the sixth content information among the content information displayed at the current interface; and displaying a session interface for a second communication group in response to a triggering operation on the second communication group among communication groups associated with the sixth content information;

or, the information processing method further comprising:

in response to an unread message is generated in the third communication group associated with seventh content information among the content information, displaying a first preset prompt label at a position corresponding to seventh content information, and/or displaying a second preset prompt label at a position corresponding to a third communication group associated with the seventh content information.

16. The information processing method according to claim 1, wherein a communication group created via the interface element is configured as that group entry verification is enabled by default; and wherein the information processing method further comprises:

updating eighth content information displayed by the current interface correspondingly after the content of the eighth content information is edited, and keeping a name of a communication group associated with the eighth content information unchanged; or, deleting ninth content information among the content information displayed by the current interface after the ninth content information is deleted; or, updating an arrangement order of tenth content information among the content information displayed by the current interface correspondingly after the arrangement order of the tenth content information with respect to other content information is adjusted, and keeping a member identity in a communication group associated with the tenth content information unchanged, wherein an information identity of the content information is related to the arrangement order of the content information, and an information identity of the content information associated with members is displayed in the member identity.

17. The information processing method according to claim 1, further comprising:

canceling an association relationship between a fourth communication group and associated content information in response to a canceling operation on the fourth communication group.

18. The information processing method according to claim 1, wherein the first user is a user who belongs with an owner of the first content information; or the first user is a target user who mentions the owner of the first content information in the first-type information or the second-type information, wherein the first-type information or the second-type information in which the owner of the first content information is mentioned belongs to the target user.

19. An information processing method, comprising:

displaying content information within a selected time segment in a first region of a current interface, wherein the content information comprises published task information about collaborative tasks, and wherein the first region is configured to display a time segment selection control through which the time segment is selected;

determining first content information in response to a first operation event for selecting certain information from the content information displayed in the first region of the current interface, wherein the first content information comprises information of a first task among the collaborative tasks;

displaying an interface element in a second region of the current interface in response to determining the information of the first task, wherein the interface element is configured to enable to identify communication groups associated with the information of the first task, and wherein the interface element is a single interface element;

determining and displaying group information associated with the first content information in response to a second operation performed on the interface element;

determining a first user based on a collaborative relationship between the first user and a user who possesses the information of the first task;

determining a second user based on second content information that comprises information of a second task among the collaborative tasks, wherein the second task has an association relationship with the first task;

displaying a search box in a group creation interface, wherein the search box is configured to search for at least one additional user;

creating a new communication group associated with the information of the first task based on the first user, the second user, and the at least one additional user; and displaying a session of the new communication group comprising the first user, the second user, and the at least one additional user in a third region of the current interface.

20. An electronic device, comprising:

at least one memory and at least one processor; wherein the memory is configured to store program codes, and wherein the program codes, when executed by the processor, cause the electronic device to perform operations comprising:

displaying content information within a selected time segment in a first region of a current interface, wherein the content information comprises published task information about collaborative tasks, and wherein the first region is configured to display a time segment selection control through which the time segment is selected;

determining first content information in response to a first operation event for selecting certain information from the content information displayed in the first region of the current interface, wherein the first content information comprises information of a first task among the collaborative tasks;

displaying an interface element in a second region of the current interface in response to determining the information of the first task, wherein the interface element is configured to enable creations of communication groups associated with the information of the first task, and wherein the interface element is a single interface element;

displaying a group creation interface in response to a second operation event performed on the interface element;

determining a first user based on a collaborative relationship between the first user and an owner of the information of the first task, and displaying a representation corresponding to the first user in the group creation interface;

determining a second user based on second content information that comprises information of a second task among the collaborative tasks, and displaying a representation corresponding to the second user in the group creation interface, wherein the second task has an association relationship with the first task;

displaying a search box in the group creation interface, wherein the search box is configured to search for at least one additional user;

creating a first communication group associated with the information of the first task based on the first user, the second user, and the at least one additional user, the created first communication group being a new group; and displaying a session of the first communication group comprising the first user, the second user, and the at least one additional user in a third region of the current interface.

* * * * *